United States Patent
Braudaway et al.

(10) Patent No.: US 6,690,383 B1
(45) Date of Patent: Feb. 10, 2004

(54) COLOR CALIBRATION OF DISPLAYS

(75) Inventors: Gordon Wesley Braudaway, Yorktown Heights, NY (US); Albert Nessim Cazes, Mount Kisco, NY (US); James Edward Christensen, Cortlandt Manor, NY (US); Michael James Cordes, Newburgh, NY (US); Donald Michael DeCain, New York, NY (US); Shui-Chih Alan Lien, Briarcliff Manor, NY (US); Frederick Cole Mintzer, Shrub Oak, NY (US); Steven Lorenz Wright, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/490,545

(22) Filed: Jan. 24, 2000

Related U.S. Application Data

(60) Provisional application No. 60/116,978, filed on Jan. 25, 1999.

(51) Int. Cl.[7] .................................................. G09G 5/02
(52) U.S. Cl. ........................ 345/600; 345/603; 345/604
(58) Field of Search ............................ 345/3.1, 10, 22, 345/589–605, 690, 3.2, 38, 50, 72–89, 104; 382/162–167

(56) References Cited

U.S. PATENT DOCUMENTS

| | | | | |
|---|---|---|---|---|
| 4,600,274 A | * | 7/1986 | Morozumi | 349/109 |
| 5,124,688 A | * | 6/1992 | Rumball | 345/603 |
| 5,381,349 A | * | 1/1995 | Winter | 382/167 |
| 5,389,945 A | * | 2/1995 | Sheridon | 345/85 |
| 5,483,259 A | * | 1/1996 | Sachs | 345/600 |
| 5,553,199 A | * | 9/1996 | Spaulding et al. | 358/1.9 |
| 5,721,572 A | * | 2/1998 | Wan et al. | 345/590 |
| 5,898,415 A | * | 4/1999 | Hansen et al. | 345/74.1 |
| 6,115,492 A | * | 9/2000 | Meltzer et al. | 382/162 |
| 6,178,007 B1 | * | 1/2001 | Harrington | 358/1.9 |
| 6,225,974 B1 | * | 5/2001 | Marsden et al. | 345/590 |

* cited by examiner

Primary Examiner—Michael Razavi
Assistant Examiner—Thu-Thao Havan
(74) Attorney, Agent, or Firm—Thomas A. Beck; Louis P. Herzberg

(57) ABSTRACT

The present invention provides methods and apparatus for the color calibration of displays. These methods are particularly useful for displays having properties different than those associated with cathode ray tubes (CRT). Some displays, for example liquid crystal displays (LCD), have a high luminance black, the chromas of their primaries are not independent of their luminance levels, the intensities of their primaries are not strictly monotonically increasing with respect to their RGB levels, the color additivity of their subpixels is affected by crosstalk or leakage and their color measurements are dependent on the view angle of the observer. Therefore, the usage of CRT methods is deficient for such displays. The methods and apparatus of the present invention overcome several deficiencies generally found in non-CRT display devices by employing techniques associated with the use of restricted ranges for the primaries, subtracting the color black from all color measurements, forming a modified display matrix and/or creating tables which correct errors due to the non-linearities or color leakages of these display devices. These enable images to be processed using algorithms of different complexity and precision.

32 Claims, 13 Drawing Sheets

COLOR CALIBRATION OF DISPLAYS

This application claims the benefit of provisional application No. 60/116,978, filed Jan. 25, 1999.

FIELD OF THE INVENTION

This application relates to the field of digital imaging. It is more specifically concerned with quality of images displayed on displays through color calibration.

BACKGROUND OF THE INVENTION.

The color calibration of LCD monitors usually employs methods developed for cathode ray tube (CRT) displays and fully described in the literature in ways known to those skilled in the art. These methods generally assumes that the display satisfies the following conditions:

The CIE chromaticities xyz of the red, green and blue primaries are independent of their luminance levels.

Colors within the display gamut are additive, such that given any color with display-RGB coordinates (R,G,B) its corresponding CIE XYZ vector (X,Y,Z) is equal to the sum of the CIE XYZ vectors of its primaries with display-RGB coordinates: (R,0,0), (0,G,0), (0,0,B).

The intensity of a primary is monotonically increasing with respect to its index value. For example, if a CRT has a range of 256 levels, then red will reach its maximum CIE X for display-RGB coordinates (255,0,0), green will have a maximum CIE Y for (0,255,0) and blue will attain its maximum CIE Z for (0,0,255).

The luminance for the color black of the display is very low. It is not unusual to measure values lower than 0.005 foot-lamberts (fL).

The color of a pixel is independent of the view angle of the observer.

CRT displays generally satisfy these five conditions. Also, generally the linear behavior of a CRT permits us to define, through a calibration process, a 3×3 display matrix Md and intensity tables (also referred to as gamma tables) for each primary. We use the inverse of Md to transform the CIE XYZ color vectors of an image pixel into matrix-RGB. Then we apply the gamma tables to obtain their corresponding display-RGB values. An advantage of this method is that it is not computationally expensive. However, we noticed that LCD displays do not generally satisfy the above five conditions. A group of LCD displays were examined and it was observed that:

The CIE chromaticities xyz for the primaries were dependent on their luminance levels.

Low luminance colors were not additive.

An LCD model we tested reached its maxima CIE X for red level 255, CIE Y for green level 248 and CIE Z for blue level 212.

The luminance for black was about 0.1 fL or at least one order of magnitude higher than the corresponding one for a CRT.

The color of a pixel was dependent on the angle of view.

It would be advantageous to have a method to calibrate any display including LCD, which takes into account a displays special conditions.

SUMMARY OF THE INVENTION

This present invention provides methods and apparatus to color calibrate a display. An embodiment of the invention assumes that the observer's angle of view is almost perpendicular to the center of the screen. Embodiments of the invention include one or more of the following invention aspects:

The ranges for the display coordinates R, G and B are restricted to the levels of red, green and blue which give monotonically increasing values of CIE X, Y and Z respectively. For example the LCD mentioned above has a useful range which is restricted to $0 \leq R \leq 255$, $0 \leq G \leq 248$, $0 \leq B \leq 212$.

In each one of these three ranges we select M sample points for the primaries and their related grays. Their values are used to display patches at the center of a screen which are photometrically measured with a spectroradiometer or colorimeter. Black is subtracted from the resulting CIE XYZ data, before a 3×3 display matrix Md is formed.

The inverse of Md is used to convert the CIE XYZ measurements into matrix-RGB coordinates. For each level, we compare the sum of the primaries to its related gray. We assume that the differences result from errors such as the non-linearity of an LCD and leakage between subpixels. These are computed for each level, then expanded into two types of interpolation tables. The non-linearity of a display device such as an LCD includes the non additivity of primaries.

Given a pixel of any color, we develop a technique for the estimation of its leakage error. This is done by comparing its normalized matrix RGB values, to those of its related primaries and grays.

The processing of an image can be done using one of two methods: the Simple-algorithm and the Full-algorithm. The former is faster than the latter but it is also less precise. A set of gamma tables are developed for each method.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

The present invention provides methods and apparatus for calibrating a display using a display profile in conjunction with display specific corrections of the display in forming calibration results. Although the present invention is applicable to different display technologies it has been found to be particularly useful for LCD displays. As such the following description is related to LCD displays, but it is similarly useful for other displays, such as plasma displays, electroluminescent displays, light-emitting diode displays, flat cathode-ray tube displays etc.

In an example embodiment of the present invention we use an active matrix TFT/LCD with 256 color levels per primary and at least a resolution of 1024×768 pixels to describe the invention. The notation we use for vectors and arrays starts at index 0. Thus, $V[2]$ represents the third element of vector V, and $A[3, 0]$ refers to the element of array A situated in the fourth row and first column. If an array A has for example. dimensions 3×9, then $A\_col[j]$ with $0 \leq j \leq 8$ will refer to its column number (j+1) and $A\_row[i]$ with $0 \leq i \leq 2$ to its row number (i+1). Three types of coordinates are mentioned in this embodiment: CIE XYZ, display-RGB and matrix-RGB. CIE XYZ vectors have the format (X,Y,Z) and they are also known by those skilled in the art as tristimulus color vectors. Their coordinates are positive floating point numbers and they are usually produced by measuring colors with a photometer. Display-RGB vectors have the format (R, G, B). Their coordinates are non-negative integers and for our embodiment their values are between zero and 255. They are used by a computer to render colors on a display. Matrix-RGB vectors have also the format (R, G, B) but in this case the coordinates are floating point numbers. In our embodiment they are obtained by multiplying a non-singular 3×3 matrix by a CIE XYZ vector.

A. Overview

Figure 1:
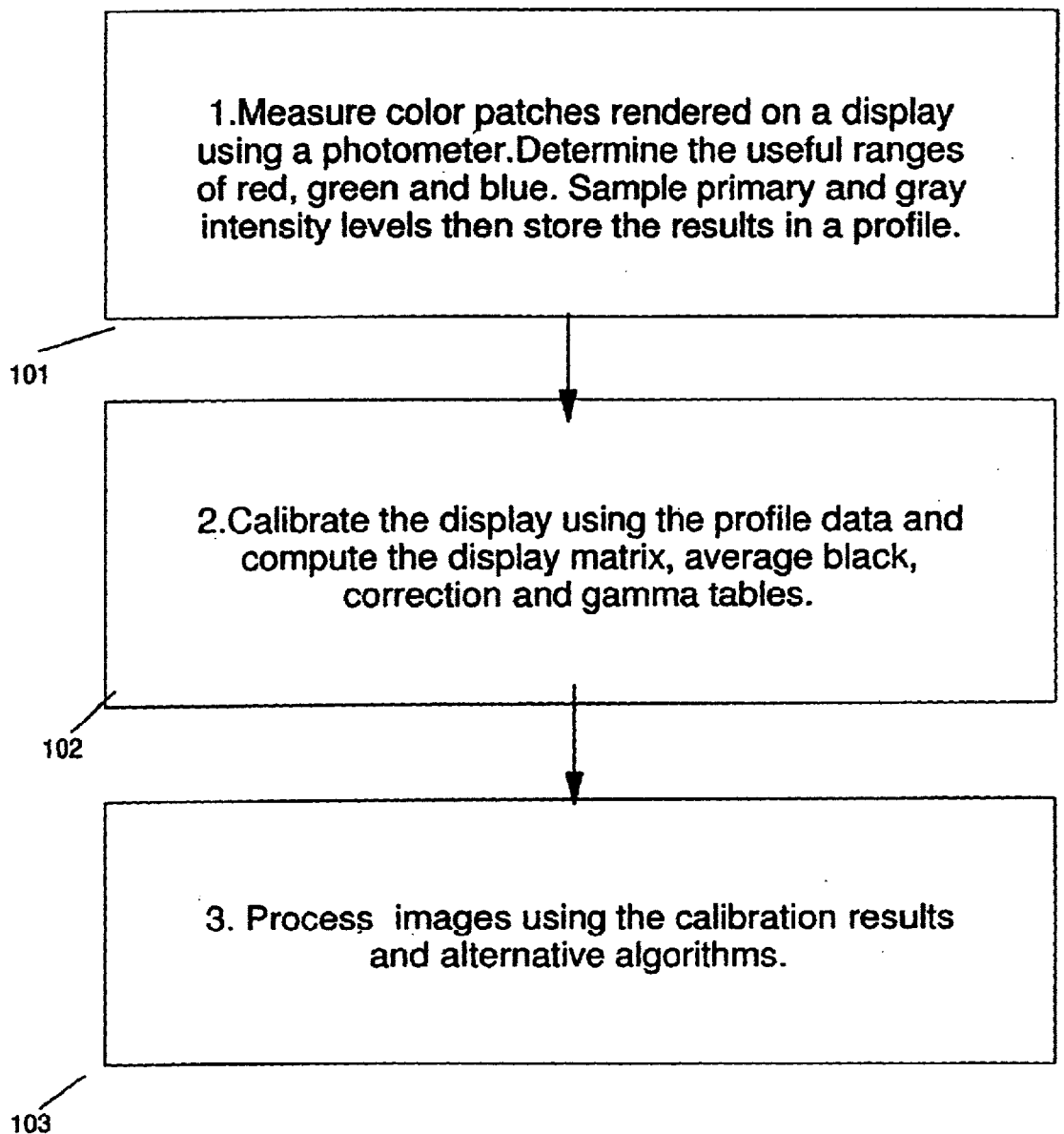
FIG. 1 shows an example of a diagrammatic summary for the three parts of the invention: measurements, calibration and Image Processing.

FIG. 1 shows an overview of this invention which includes three parts. It shows the overall steps to color calibrate an LCD display.

1. Measure Color Patches and Create a Display Profile. (101)

The useful, restricted, display-RGB ranges of the primaries are determined by rendering uniform color square patches on the display then measuring their CIE XYZ coordinates with a photometer. These restricted ranges are used to determine sample points for the primaries and related grays. Once again these points are rendered, measured and the results are stored in a display profile.

2. Calibrate the Display Using Its Profile Data. (102)

The display is calibrated using the display profile in conjunction with display specific corrections for said display in forming calibration results. These display specific corrections generally include overcoming several display deficiencies. These deficiencies are due to such things as high intensity display black, non additivity of primaries, leakage between sub-pixels, non linearities etc. Each display technology generally has its own group of important display deficiencies.

The CIE XYZ measurements are read from the display profile, then black is subtracted from all of them. Using the CIE XYZ vectors corresponding to the maximum levels of the primaries, a display matrix Md and its inverse Mdi are computed. The latter is used to transform all the measurements from CIE XYZ to matrix-RGB coordinates. Then, the non-linear errors and color leakages are computed and a model for the display is formed. The non-linearity of an LCD generally includes the non additivity of primaries. Using linear interpolation, color correction tables are created. Finally, using log-log linear interpolation, one or more sets of gamma tables are computed.

3. Process Images Using the Calibration Results. (103)

To process a particular image, the inverse matrix Mdi, average black, correction and gamma tables which were computed in the previous section are used to convert the CIE XYZ coordinates of any pixel stored in an image file of the particular image into display-RGB. Two example techniques of image processing display algorithms are desribed to perform this task: the Simple-algorithm and the Full-algorithm. The former takes only into account the non-linear errors and it ignores the leakage tables. Therefore, it is faster but less precise than the latter.

B. Measurements

Figure 2:
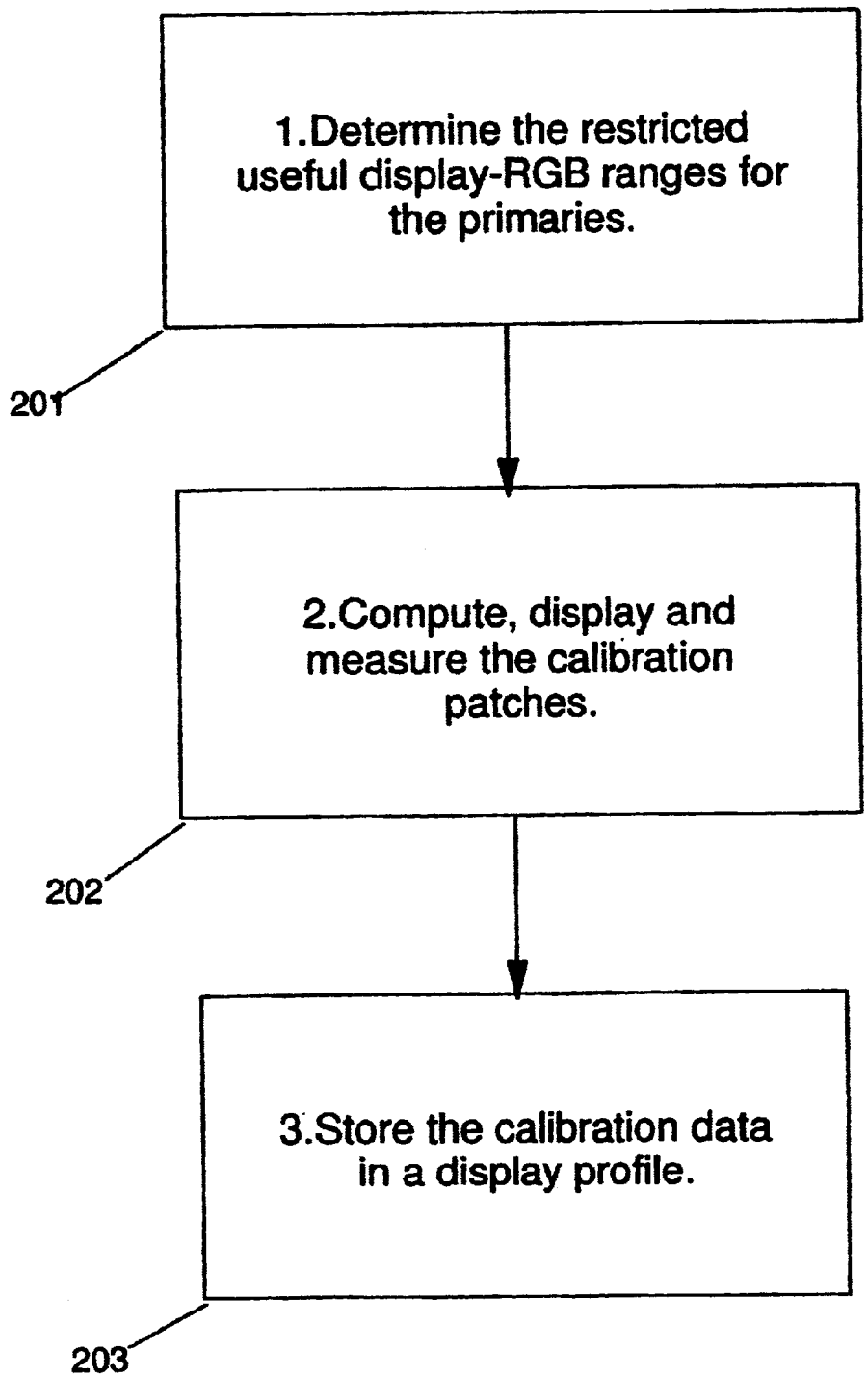
FIG. 2 is an example flowchart for performing measurements to obtain calibration data in a display profile in accordance with the invention.

FIG. 2 shows an example flowchart for an embodiment performing measurements to obtain calibration data in a display profile. This flowchart includes three parts: determine the useful, restricted, display-RGB ranges for the primaries, compute then render and measure the calibration patches; and finally store the results in a profile. In an example embodiment, measurements are made with a photometer which could be either a spectroradiometer or a colorimeter. The photometer is advantagously attached to the same computer which runs the display. It is placed perpendicular to the center of the screen and at least half a meter from it. Square patches of a single color are centered on the screen. The patches generally have dimensions of at least 10 by 10 centimeters but smaller patches may be used. The photometer focuses on an area with a diameter of at least two centimeters located at the center of the patch. The color of the patch is specified in display-RGB coordinates (R, G, B). In this embodiment the levels of R, G and B are between 0 and 255 useful for an eight bit system. The photometer returns the measurement in CIE XYZ coordinates (X, Y, Z) and it is able to measure a CIE Y of at least 0.1 fL 1. Determine the Useful or Restricted Display-RGB Ranges for the Primaries. (201)

In one embodiment, we rendered three sets each of 256 square patches on a LCD display. Each set contained display-RGB levels 0 thru 255 of a single primary color. We measured each patch with a photometer and recorded the resulting CIE XYZ coordinates. Then, for each set we created a two dimensional graph. For the reds we represented display-RGB R levels on the abscissa versus CIE X values on the ordinate, for the greens G versus Y and for the blues B versus Z. We expected that these curves, which are also called gamma curves, will be monotonically increasing from levels 0 to 255, but we noticed that some of them reached their maxima at a level much lower than 255. For example, in at least one case this value was 212 for the blues. Therefore we defined levels 0 thru 212 as the restricted display-RGB range for blue. The same display had restricted ranges of 0 thru 255 for the reds and 0 thru 248 for the greens.

The method we execute to find the levels representing these maxima depends on the measurement speed of the photometer used. For a fast calorimeter, we render three sets of primary patches with levels starting from 180 and ending at 255 then use the technique of the previous paragraph. For a slow spectroradiometer, the function FindMax( ) is used which reduces the number of measurements. It assumes that the gamma curve for each primary is monotonically increasing up to a single absolute maximum and it is symbolically represented as follows:

MaxRGB=FindMax(Primary, HighestRGB,SizeFirstInt, SizeLastInt)

Its input parameters are:

Primary An integer representing the selected primary. It is equal to 0 for red, 1 for green and 2 for blue.

HighestRGB An integer representing the highest display-RGB level for the selected primary. In our embodiment this value will always be 255.

SizeFirstInt An integer representing the size of the first processing interval. In our embodiment, it should be greater than one and smaller than 255.

SizeLastInt An integer representing the size of the last processing interval. Its default is one A higher value should be used if the measurements are noisy.

The output for this function is:

MaxRGB An integer representing the maximum display-RGB level for the useful range of the selected primary.

For our embodiment, we apply this function as follows:

Set MaxDispRed=FindMaxXYZ(0, 255, 4, 1)
Set MaxDispGreen=FindMaxXYZ(1, 255, 4, 1)
Set MaxDispBlue=FindMaxXYZ(2, 255, 20, 1)

Where, the maximum useful level for display-RGB R is MaxDispRed, the maximum useful level for display-RGB G is MaxDispGreen and the maximum useful level for display-RGB B is MaxDispBlue.

Therefore the restricted display-RGB range for R is the interval: [0, MaxDispRed], the restricted display-RGB range for G is the interval: [0, MaxDispGreen], and the restricted display-RGB range for B is the interval: [0, MaxDispBlue]. It is advantagous to make the useful range equal to or less than the restricted range.

Figure 3:
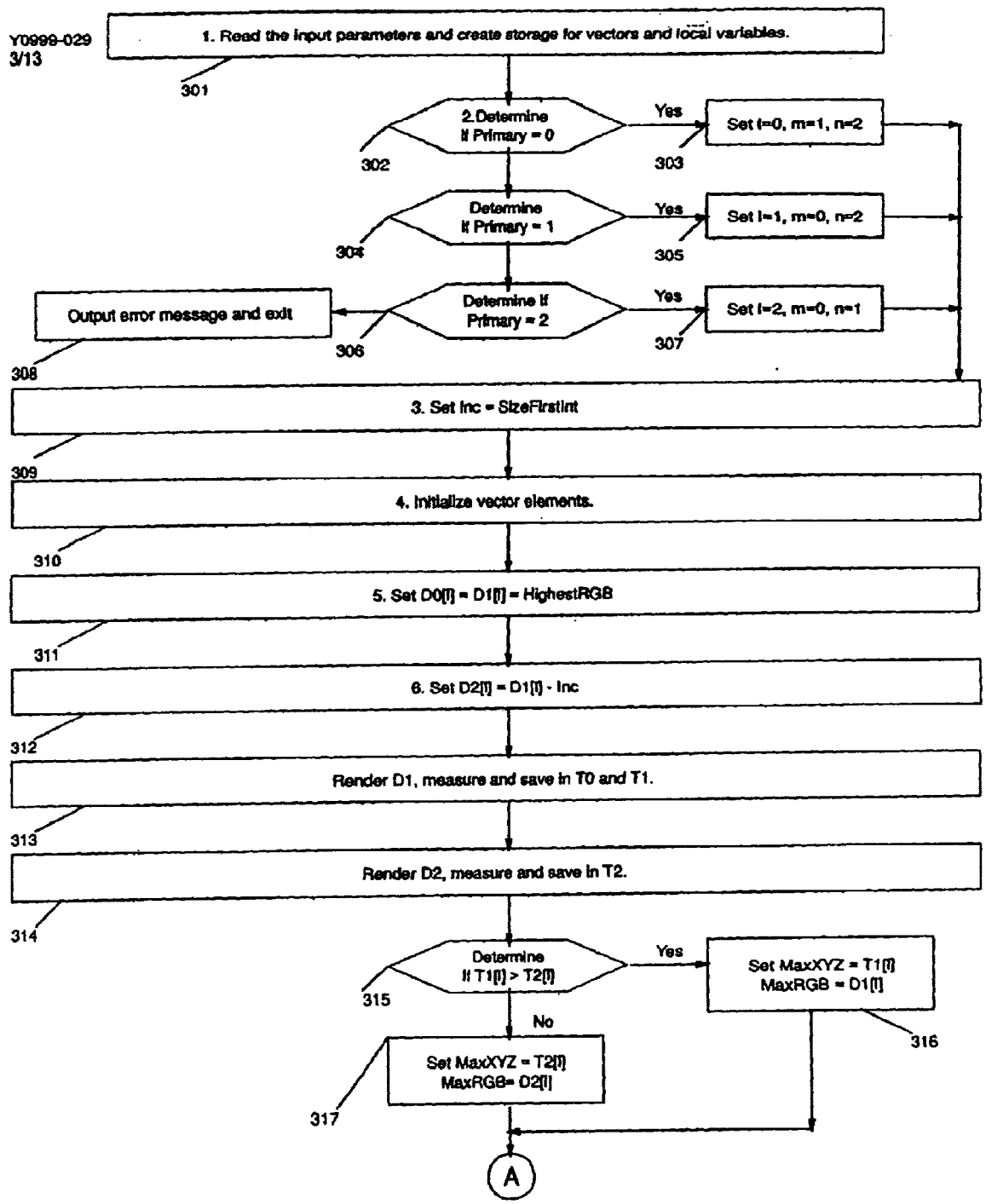
FIG. 3 shows an example of a diagrammatic representation of the FindMaxXYZ ( . . . ) function which is applied in the measurements section to find a useful or restricted ranges for the primaries in accordance with the invention.
Figure 3:
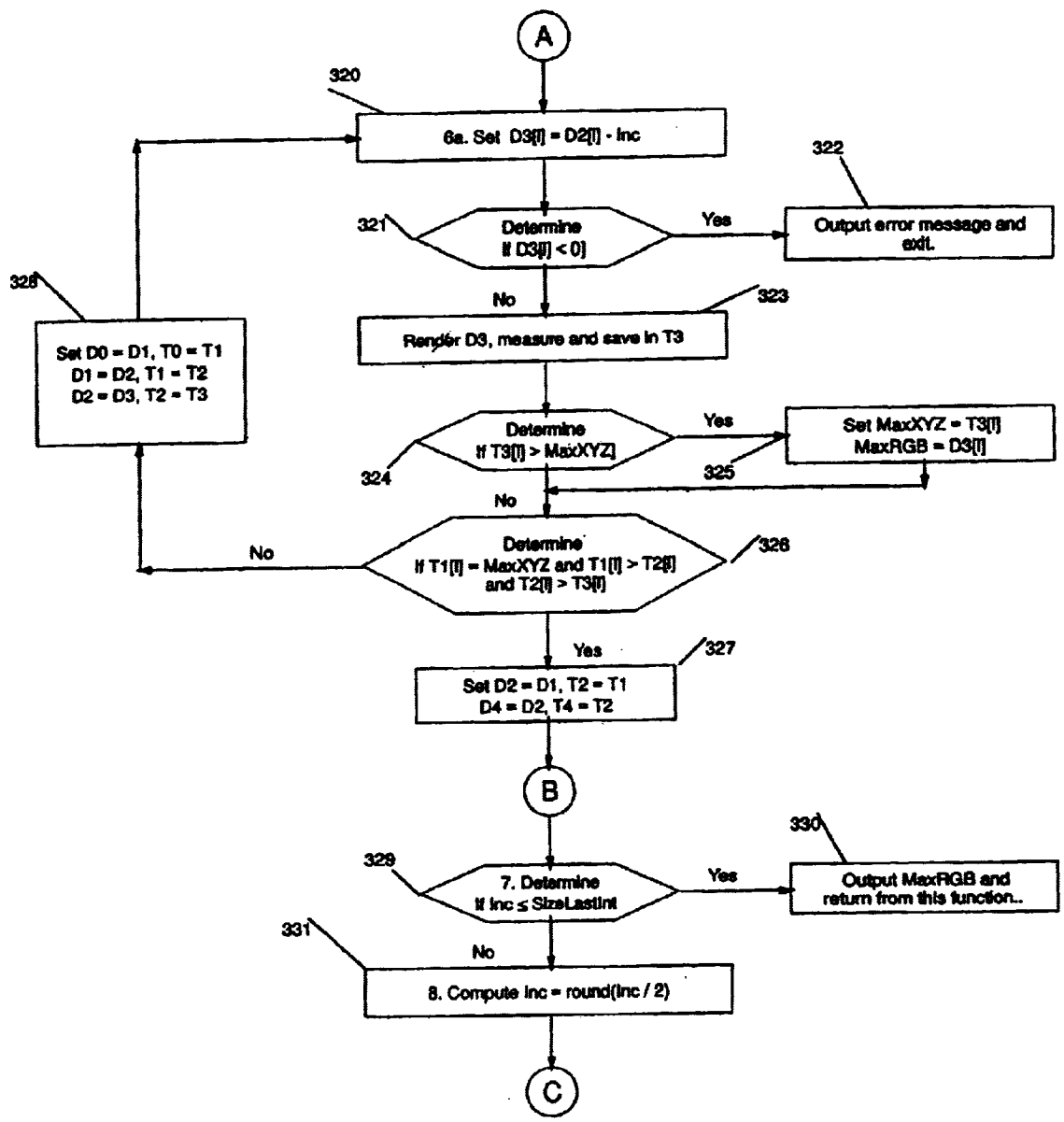
Figure 3:
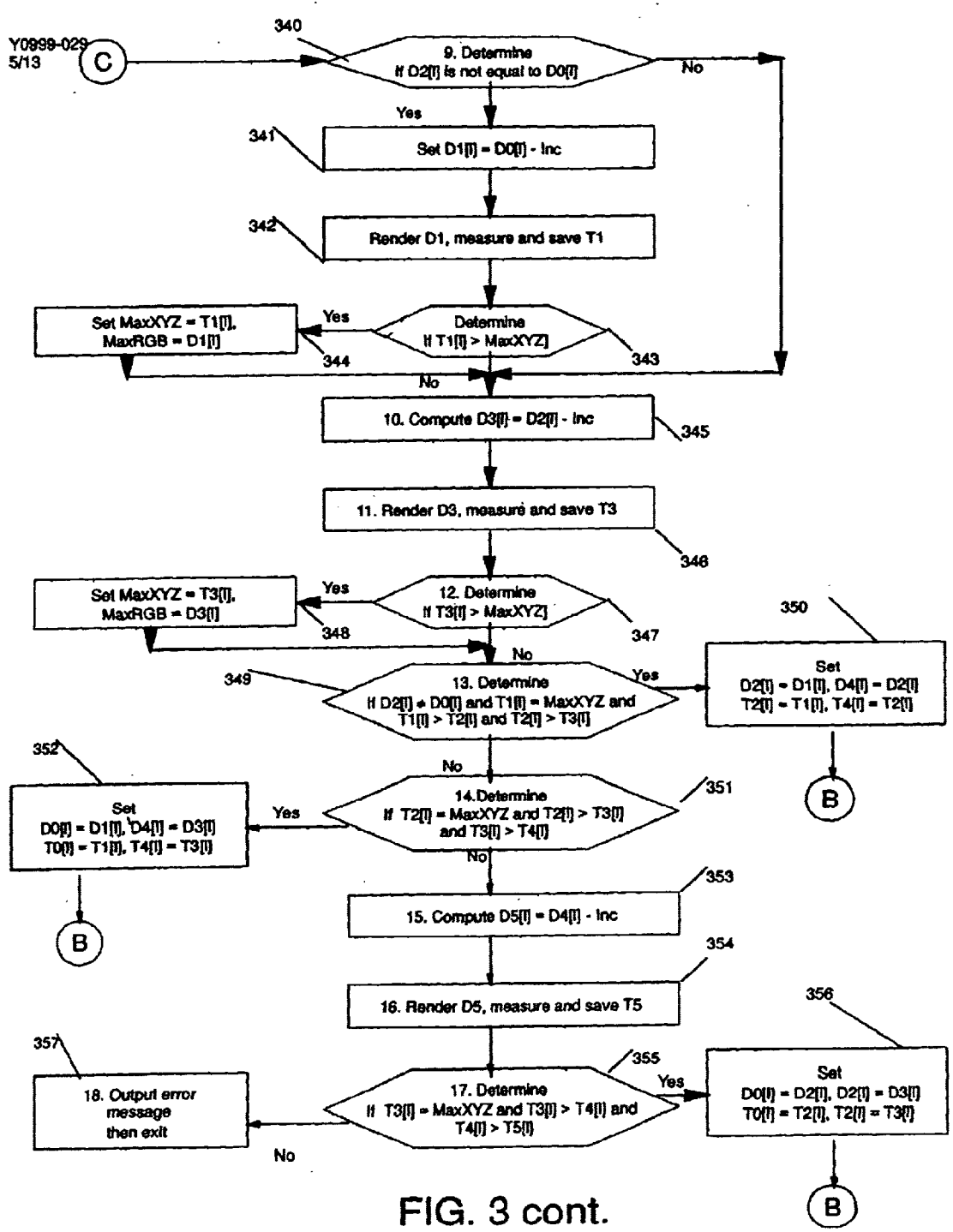

FIG. 3 shows an example of the steps to execute the FindMaxXYZ( ) function:

1. Read the input parameters: Primary, HighestRGB, SizeFirstInt, SizeLastInt. (301)
   Create storage of type:
     integer for 1×3 display-RGB vectors D0[3], D1[3], D2[3], D3[3], D4[3], D5[3],
     floating point for 1×3 CIE XYZ vectors: T0[3], T1[3], T2[3], T3[3], T4[3], T5[3],
     integers for local variables: Inc, 1, m, n, MaxRGB,
     floating point for local variable MaxXYZ.

2. Determine the selected primary.
   If Primary is equal to 0 (302)
     then assign 1=0, m=1, n=2 and go to step 3. (303)
   If Primary is equal to 1 (304)
     then assign 1=1, m=0, n=2 and go to step 3. (305)
   If Primary is equal to 2 (306)
     then assign 1=2, m=0, n=1 and go to step 3 (307)
     otherwise output error message and exit this function. (308)

3. Define the sample level increment.
   Set Inc=SizeFirstInt. (309)

4. Initialize vector elements. (310)
   Set D0[m]=D1[m]=D2[m]=D3[m]=D4[m]=D5[m]=0.
   Set D0[n]=D1[n]=D2[n]=D3[n]=D4[n]=D5[n]=0.

5. Select for search area the primary range starting at level HighestRGB and ending at 0.
   Assign D0[1]=D1[1]=HighestRGB. (311)

6. Using sample points separarated by Inc levels, locate the general area containing the maximum useful level.

Compute D2[1]=D1[1]–Inc. (312)
Render patch with color D1 and measure and save the results in T0, T1. (313)
Render patch with color D2 and measure and save the results in T2. (314)
Determine if T1[1]>T2[1]. (315)
  If yes, set MaxXYZ=T1[1]
    and MaxRGB=D1[1]. (316)
  If not, set MaxXYZ=T2[1]
    and MaxRGB=D2[1]. (317)

6a. Compute D3[1]=D2[1]–Inc. (320)
Determine if D3[1]<0. (321)
  If yes output error message and exit. (322)
  If not render patch D3, measure and save the results in T3. (323)
Check if T3[1]>MaxXYZ (324)
  then set MaxXYZ=T3[1]
    and MaxRGB=D3[1]. (325)
Determine if (T1[1]=MaxXYZ and T1[1]>T2[1] and T2[1]>T3[1]) (326)
  If yes set for 0≤i≤2, D2[i]=D1[i], T2[i]=T1[i], D4[i]=D2[i], T4[i]=T2[i]
    And go to step 7. (327)
  If not set for 0≤i ≤2, D0[i]=D1[i], D1[i]=D2[i], D2[i]=D3
    T0[i]=T1[i], T1[i]=T2[i], T2[i]=T3[i]
    then go to step 6a. (328)

7. Determine if Inc≤SizeLastInt (329)
   then output MaxRGB and return from this function. (330)

8. Compute Inc=round(Inc/2). (331)

9. Determine if D2[1]≈D0[1] then: (340)
   set D1[1]=D0[1]–Inc (341)
   Render patch D1, measure and save the results in T1. (342)
   Determine if T1[1]>MaxXYZ (343)
     then set MaxXYZ=T1[1]
       and MaxRGB=D1[1]. (344)

10. Compute D3[1]=D2[1]–Inc. (345)

11. Render patch D3 and measure and save the results in T3. (346)

12. Determine if T3[1]>MaxXYZ (347)
    then set MaxXYZ=T3[1]
      and MaxRGB=D3[1]. (348)

13. Check if (D2[1]≈D0[1] and T1[1]=MaxXYZ and T1[1]>T2[1] and T2[1]>T3[1]) (349)
    then set D2[1]=D1[1], D4[1]=D2[1], T2[1]=T1[1], T4[1]=T2[1]
    and return to step 7. (350)

14. Check if (T2[1]=MaxXYZ and T2[1]>T3[1] and T3[1]>T4[1]) (351)
    then set D0[1]=D1[1], D4[1]=D3[1], T0[1]=T1[1], T4[1]=T3[1]
    and return to step 7. (352)

15. Compute D5[1]=D4[1]–Inc. (353)

16. Render patch D5 and measure and save the results in T5. (354)

17. Check if (T3[1]=MaxXYZ and T3[1]>T4[1] and T4[1]>T5[1]) (355)
    then set D0[1]=D2[1], D2[1]=D3[1], T0[1]=T2[1], T2[1]=T3[1]
    and return to step 7. (356)

18. Output an error message then exit this function. (357)

The blue primary is used to illustrate this function. This is done by issuing the following instruction:

$$\text{MaxDispBlue}=\text{FindMax}XYZ(2, 255, 20, 1) \qquad 5$$

where the input parameters are set to 2 for Color, 255 for HighestRGB, 20 for SizeFirstInt and 1 for SizeLastInt. The function returns the integer value MaxDispBlue which represents the display-RGB level of B which gives the maximum CIE XYZ level of Z. Starting from the Highest RGB and using an interval equal in length to SizeFirstInt, the program displays and measures the following blue patches with display-RGB coordinates:

(0, 0, 255), (0, 0, 235), (0, 0, 215), (0, 0, 195), (0, 0, 175)

and it obtains the corresponding CIE XYZ values of:

(3, 2, 15), (2, 2, 16), (2, 1.5, 17), (1.3, 1.4, 12), (1.2, 1.3, 9).

A sample point is considered to be a local maximum if its value for Z is greater than those corresponding to the following two and the decrease for all three is monotone. Therefore, in this example, the local maximum is given by the third sample with B equal to 215. The next iteration uses for search area the blue levels 235 through 195 and an interval size of 10 which is equal to half the previous one. The following display-RGB sample points are rendered:

(0, 0, 235), (0, 0, 225), (0, 0, 215), (0, 0, 205)

giving the corresponding CIE XYZ values of:

(2, 2, 16), (2, 1.6, 18.5), (2, 1.5, 17), (2, 1.48, 14)

The new local maximum is given by the second sample with B equal to 225. Therefore, the new search area is restricted to blue levels 235 through 215 and the interval size is reduced from ten to five. This process is repeated until the size of the interval is equal to or smaller than the input parameter SizeLastInt.

2. Compute, Display and Measure the Calibration Patches. (202)

In the last step of FIG. 2, we use the results of the previous procedure to reduce the display RGB levels of the primaries to [0, MaxDispRed], [0, MaxDispGreen], [0, MaxDispBlue]. Then we choose an integer M at least greater than 16, for our embodiment we take M=32, to divide these three ranges into M parts and obtain the sample points for red, green, blue and related grays which are stored in four 3×M integer sample arrays: RedDRGB[i,j], GreenDRGB[i,j], BlueDRGB[i,j], GrayDRGB[i,j] where the suffix DRGB stands for the display-RGB space. We describe the columns of these four arrays as follows:

For 0<j<M−1:

$$\text{Set RedDRGB\_col}[j] = \begin{pmatrix} round\left(\frac{MaxDispRed}{M-1}*j\right) \\ 0 \\ 0 \end{pmatrix}$$

$$\text{Set GreenDRGB\_col}[j] = \begin{pmatrix} 0 \\ round\left(\frac{MaxDispGreen}{M-1}*j\right) \\ 0 \end{pmatrix}$$

$$\text{Set BlueDRGB\_col}[j] = \begin{pmatrix} 0 \\ 0 \\ round\left(\frac{MaxDispBlue}{M-1}*j\right) \end{pmatrix}$$

$$\text{Set GrayDRGB\_col}[j] = \begin{pmatrix} round\left(\frac{MaxDispRed}{M-1}*j\right) \\ round\left(\frac{MaxDispGreen}{M-1}*j\right) \\ round\left(\frac{MaxDispBlue}{M-1}*j\right) \end{pmatrix}$$

We consecutively use the column vectors of these arrays to produce four times M uniform color 10×10 patches at the center of the screen. The color of each one of these patches is measured with the photometer and its CIE (X,Y,Z) column vector is stored in one of the four corresponding 3×M floating point arrays: RedXYZ[i,j], GreenXYZ[i,j], BlueXYZ[i,j] and GrayXYZ[i,j].

3. Store the Calibration Data in a Profile. (203)

We store the data developed in (201) and (202) in a display profile. This data consists of:

The highest levels for the useful ranges of the primaries: MaxDispRed, MaxDispGreen, MaxDispBlue. These were determined in (201).

The number M of patches measured per primary or gray as set in (202).

For $0 \leq i \leq 2, 0 \leq j \leq M-1$ the calibration arrays, RedDRGB[i,j], RedXYZ[i,j], developed in (202) for the red patches.

For $0 \leq i \leq 2, 0 \leq j \leq M-1$ the calibration arrays, GreenDRGB[i,j], GreenXYZ[i,j], developed in (202) for the green patches.

For $0 \leq i \leq 2, 0 \leq j \leq M-1$ the calibration arrays, BlueDRGB[i,j], BlueXYZ[i,j], developed in (202) for the blue patches.

For $0 \leq i \leq 2, 0 \leq j \leq M-1$ the calibration arrays, GrayDRGB[i,j], GrayXYZ[i,j], developed in (202) for the gray patches.

C. Calibration

Figure 4:
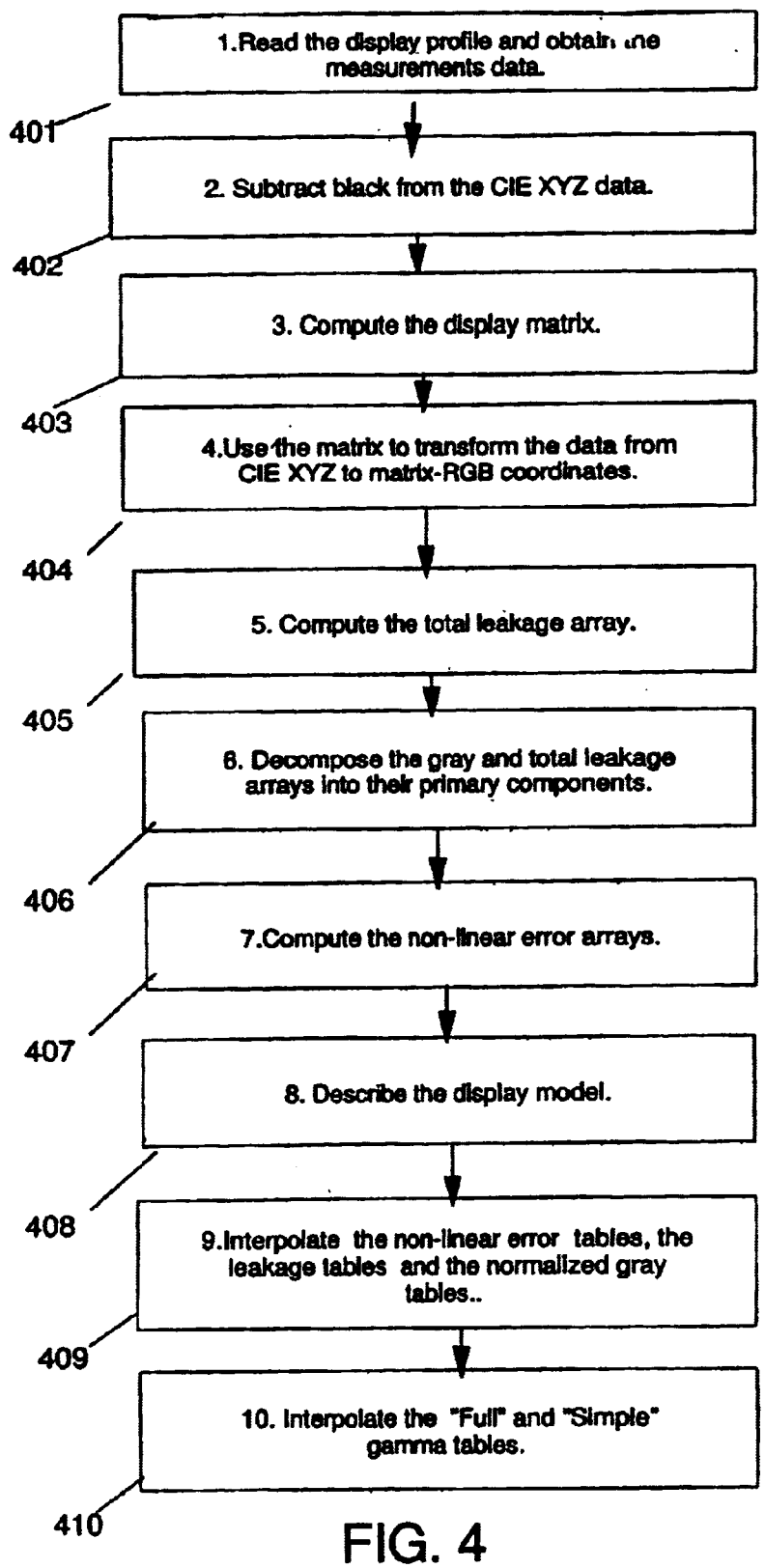
FIG. 4 shows an example the steps required to process calibration data in accordance with the invention.

FIG. 4 ia a flowchart of this section and it contains eight parts: read the display profile, subtract black form the CIE XYZ calibration data, form the display matrix, use it to transform the calibration data from CIE XYZ to matrix-RGB coordinates, decompose gray into its primary components and do the same for the total color leakage (the difference between the sum of the primaries and their corresponding gray), compute the non-linear errors for each primary which include the non-additivity of the primaries, describe the display model, create correction tables for the non-linear errors, leakages and normalized grays, finally compute the gamma tables.

1. Read the Display Profile and Obtain the Measurement Data. (401)

The display profile is read and the data is stored under the same names.

2. Subtract Black from the CIE XYZ Data. (402)

First we compute an average 1×3 black vector for this display: AvgBlackXYZ[i]. Then we subtract it from each one of the column vectors of the measured 3×M CIE XYZ arrays for red, green, blue and gray and obtain the 3×M arrays RedXYZk, GreenXYZk, BlueXYZk and GrayXYZk:

For $0 \leq i \leq 2, 0 \leq j \leq M-1$:

AvgBlackXYZ[i]=RedXYZ[i,0]+GreenXYZ[i,0]+BlueXYZ[i,0]GrayXYZ[i,0]/4

Set RedXYZk[i,j]=RedXYZ[i,j]−AvgBlackXYZ[i]

Set GreenXYZk[i,j]=GreenXYZ[i,j]−AvgBlackXYZ[i]

Set BlueXYZk[i,j]=BlueXYZ[i,j]−AvgBlackXYZ[i]

Set GrayXYZk[i,j]=GrayXYZ[i,j]−AvgBlackXYZ[i]

3. Compute the Display Matrix. (403)

Using the last column vectors of arrays RedXYZk[i,j], GreenXYZk[i,j], BlueXYZk[i,j] we define the display matrix Md:

$$Md = \begin{pmatrix} RedXYZk[0, M-1] & GreenXYZk[0, M-1] & BlueXYZk[0, M-1] \\ RedXYZk[1, M-1] & GreenXYZk[1, M-1] & BlueXYZk[0, M-1] \\ RedXYZk[2, M-1] & GreenXYZk[2, M-1] & BlueXYZk[2, M-1] \end{pmatrix}$$

Then we compute its inverse and call it Mdi:

Mdi=inverse(Md)

4. Use the Matrix to Transform the Data from Cie XYZ to Matrix-RGB Coordinates. (404)

Given a 1×3 vector V in the CIE XYZ space, if we multiply it by matrix Mdi we obtain a 1×3 vector VMRGB in the matrix-RGB space:

For $0 \leq i \leq 2$ compute VMRGB[i]=Mdi*V[i]

We use this operation to transform the 3×M CIE XYZ arrays of step 2 into 3×M matrix-RGB arrays.

Set RedMRGB=Mdi*RedXYZk

Set GreenMRGB=Mdi*GreenXYZk

Set BlueMRGB=Mdi*BlueXYZk

Set GrayMRGB=Mdi*GrayXYZk

We also transform the average black vector which was computed in step 2:

Set AvgBlackMRGB=Mdi*AvgBlackXYZ

5. Compute the Total Leakage Array. (405)

Next we sum the three 3×M matrix-RGB arrays for the primaries and store the results in a 3×M array: SumPrimMRGB. Then we subtract the 3×M matrix-RGB gray array from SumPrimMRGB and obtain the 3×M total leakage array SumLeakMRGB[i,j].

SumPrim*MRGB*=Red*MRGB*+Green*MRGB*+Blue*MRGB*  (1)

SumLeak*MRGB*=SumPrim*MRGB*–Gray*MRGB*  (2)

6. Decompose the Gray and Total Leakage Arrays into Their Primary Components. (406)

We decompose the 3×M arrays GrayMRGB and SumLeakMRGB developed in steps 4 and 5 respectively into the following six 3×M arrays which we define by their column vectors:

For $0 \leq j \leq M-1$:

$$RedGrayMRGB\_col[j] = \begin{pmatrix} GrayMRGB[0, j] \\ 0 \\ 0 \end{pmatrix}$$

$$GreenGrayMRGB\_col[j] = \begin{pmatrix} 0 \\ GrayMRGB[1, j] \\ 0 \end{pmatrix}$$

$$BlueGrayMRGB\_col[j] = \begin{pmatrix} 0 \\ 0 \\ GrayMRGB[2, j] \end{pmatrix}$$

$$RedLeakMRGB\_col[j] = \begin{pmatrix} SumLeakMRGB[0, j] \\ 0 \\ 0 \end{pmatrix}$$

$$GreenLeakMRGB\_col[j] = \begin{pmatrix} 0 \\ SumLeakMRGB[1, j] \\ 0 \end{pmatrix}$$

$$BlueLeakMRGB\_col[j] = \begin{pmatrix} 0 \\ 0 \\ SumLeakMRGB[2, j] \end{pmatrix}$$

Therefore by definition we have the following equalities between 3×M arrays:

Gray*MRGB*=RedGray*MRGB*+GreenGray*MRGB*+BlueGray*MRGB*  (3)

SumLeak*MRGB*=RedLeak*MRGB*+GreenLeak*MRGB*+BlueLeak*MRGB*  (4)

7. Compute the Non-linear Error Arrays. (407)

We define the 3×M arrays RedErrorMRGB, GreenErrorMRGB, BlueErrorMRGB, which represent the non-linear errors of the display as follows:

RedError*MRGB*=Red*MRGB*–RedGray*MRGB*–RedLeak*MRGB*  (5)

GreenError*MRGB*=Green*MRGB*–GreenGray*MRGB*–GrayLeak*MRGB*  (6)

BlueError*MRGB*=Blue*MRGB*–BlueGray*MRGB*–BlueLeak*MRGB*  (7)

8. Describe the Display Model. (408)

We define the sum of the 3×M display-RGB arrays RedErrorMRGB, GreenErrorMRGB, BlueErrorMRGB by the 3×M array SumErrorMRGB:

SumErrorMRGB=RedErrorMRGB+GreenErrorMRGB+BlueErrorMRGB

Then we substitute equations (5), (6), (7) in the above equation and obtain:

SumErrorMRGB=(RedMRGB+GreenMRGB+BlueMRGB)–(RedGrayMRGB+GreenGrayMRGB+BlueGrayMRGB)–(RedLeakMRGB+GrayLeakMRGB+BlueLeakMRGB)

Using equations (1), (3) and (4) we can simplify this result as follows:

SumErrorMRGB=SumPrimMRGB–GrayMRGB–SumLeakMRGB and using equation (2) we obtain:

SumErrorMRGB=ZeroArray where the ZeroArray[i,j] is a 3×M array of zero elements.

The model we are using can be summarized by the following 3×M array additions:

RedMRGB=RedGrayMRGB+RedErrorMRGB+RedLeakMRGB

GreenMRGB=GreenGrayMRGB+GreenErrorMRGB+GreenLeakMRGB

BlueMRGB=BlueGrayMRGB+BlueErrorMRGB+BlueLeakMRGB

SumPrimMRGB=GrayMRGB+ZeroArray+SumLeakMRGB

9. Interpolate Non-linear Error Tables, Leakage Tables and Normalized Gray Tables. (409)

Figure 5:
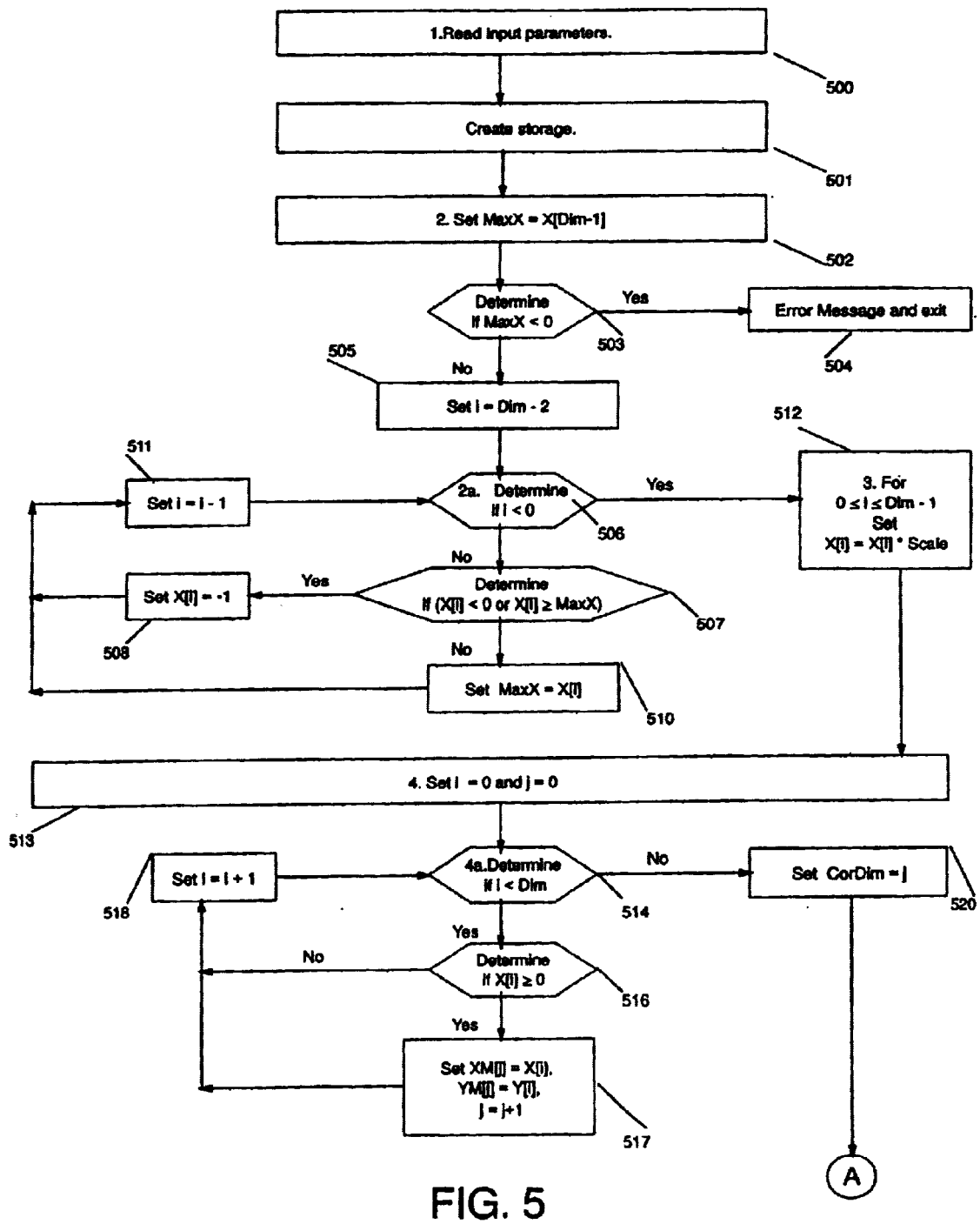
FIG. 5 shows an example of a diagrammatic representation of the LinInter ( . . . ) function used in calibration to linearly interpolate correction tables in accordance with the invention.
Figure 5:
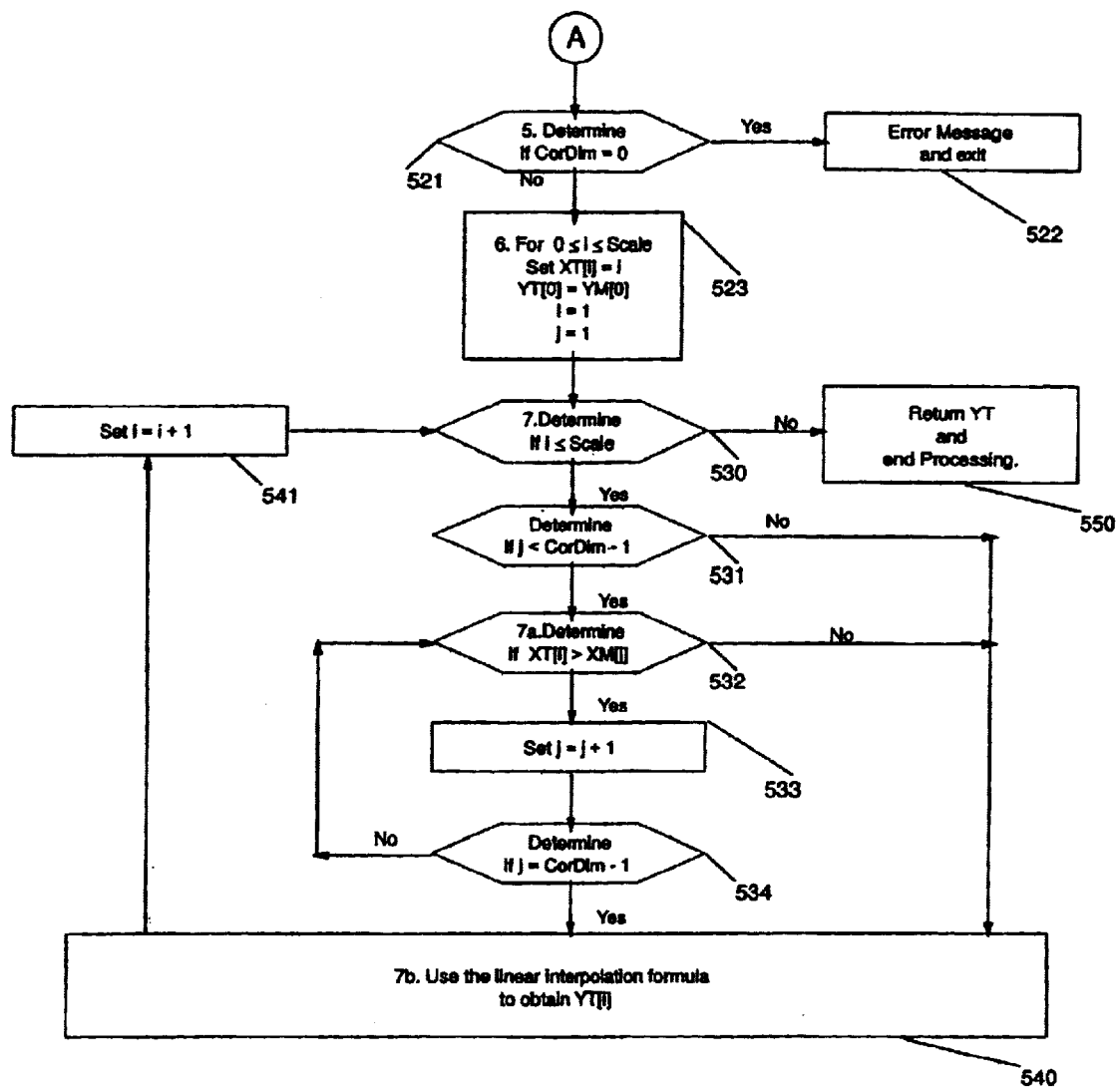

To create these tables we use the function LinInter( ), of FIG. 5, to linearly interpolate the arrays of step 6 which decompose the grays and total leakage, and the non-linear error arrays of step 7. This function is represented symbolically by:

YT=LinInter(Scale, Dim, X, Y)

The input parameters for this function are:

Scale An integer defining the dimension minus one of the table we want to create. It should be several times greater than Dim and in our embodiment we take it equal to 4095.

Dim An integer defining the dimensions of the input vectors. In our embodiment it is equal to M=32.

X A floating point vector of dimension Dim. It contains the abscissa sample points.

Y A floating point vector of dimension Dim. It contains the ordinate sample points.

The output of this function is:

YT A floating point vector of dimension Scale plus one.

To interpolate the 3×M non-linear error array RedErrorMRGB, we apply LinInter( ) three times and obtain the rows of the 3×(Scale+1) array: InterRedErrorMRGB. For all three computations, the input parameter X is represented by RedMRGB_row[0], the first row of the 3×M primary array RedMRGB, while the Y input parameter is replaced by the row RedErrorMRGB_row[i], with $0 \leq i \leq 2$, we want to interpolate. Likewise, to create the 3×(Scale+1) array InterGreenErrorMRGB we use for parameter X the GreenMRGB_row[1], which is the second row of the 3×M array GreenMRGB, and for parameter Y the three rows of the 3×M array GreenErrorMRGB. To compute the 3×(Scale+1) array InterBlueErrorMRGB[i,j], we use for parameter X BlueMRGB_row[2], the third row of the 3×M array BlueMRGB, and for parameter Y the three rows of the 3×M array BlueErrorMRGB. In what follows the three 3×(Scale+1) arrays, InterRedErrorMRGB, InterGreenErrorMRGB and InterBlueErrorMRGB, are defined by their row vectors:

For $0 \leq i \leq 2$:

Inter RedErrorMRGB_row[i]=LinInter(Scale, M, RedMRGB_row[0], RedErrorMRGB_row[i])

InterGreenErrorMRGB_row[i]=LinInter(Scale, M, GreenMRGB_row[1], GreenErrorMRGB_row[i])

InterBlueErrorMRGB_row[i]=LinInter(Scale, M, BlueMRGB_row[2], BlueErrorMRGB_row[i]

If we decide to process the images with the Full-algorithm, then we also have to interpolate the leakage and the normalized gray tables.

To create the 1×(Scale+1) vectors: InterRedLeakMRGB, InterGreenLeakMRGB and InterBlueLeakMRGB, we only apply LinInter( ) to the non-zero rows of the 3×M arrays: RedLeakMRGB, GreenLeakMRGB, BlueLeakMRGB, which were defined in step 6.

This is done as follows:

Inter RedLeakMRGB=LinInter(Scale, M, RedMRGB_row[0], RedLeakMRGB_row[0])

InterGreenLeakMRGB=LinInter(Scale, M, GreenMRGB_row[1], GreenLeakMRGB_row[1])

InterBlueLeakMRGB=LinInter(Scale,M,BlueMRGB_row[2],BlueLeakMRGB_row[2])

Next, we normalize the 3×M GrayMRGB array of step 4 and create the 3×M GrayNorm array as follows:

We compute the M dimensional vector SumColGrayMRGB, where each one of its elements SumColGrayMRGB[j], for $0 \leq j \leq M-1$, represents the sum the three coordinates of the column vector GrayMRGB_col[j] of the 3×M GrayMRGB array which was defined in step 4.

For $0 \leq j \leq M-1$:

SumColGrayMRGB[j]=GrayMRGB[0,j]+GrayMRGB[1j]+GrayMRGB[2j]

Then we create the 3×M array GrayNorm by dividing each jth column, for $0 \leq j \leq M-1$, by the corresponding jth element of the 1×M vector SumColGrayMRGB.

In the next equation, the 3×M array GrayNorm is defined by its column vectors:

$$\text{GrayNorm\_col}[j] = \begin{pmatrix} \dfrac{GrayMRGB[0, j]}{SumColGrayMRGB[j]} \\ \dfrac{GrayMRGB[1, j]}{SumColGrayMRGB[j]} \\ \dfrac{GrayMRGB[2, j]}{SumColGrayMRGB[j]} \end{pmatrix}$$

We apply the function LinInter( ) to the rows of the 3×M array GrayNorrn and obtain the three (Scale+1) dimensional vectors named: InterGrayRedNorm, InterGrayGreenNorm and InterGrayBlueNorm:

InterGrayRedNorm=LinInter(Scale,M,RedMRGB_row[0],GrayNorm_row[0])

InterGrayGreenNorm=LinInter(Scale,M,GreenMRGB_row[1],GrayNorm_row[1])

InterGrayBlueNorm=LinInter(Scale,M,BlueMRGB_row[2],GrayNorm_row[2])

FIG. 5 describes the logic of the LinInter( ) function:

1. Read parameters: Scale, Dim, X, Y. (500)
    Create storage of type:
        integer for i, j, CorDim, Scale, Dim.
        floating point MaxX
        floating point 1×Dim arrays: X[Dim], Y[Dim], XM[Dim], YM[Dim]
        integer 1×(Scale+1) array: XT[Scale+1]
        floating point 1×(Scale+1) array: YT[Scale+1]. (501)
2. Monotonize the X vector as follows:
    Set MaxX=X[Dim-1]. (502)
    Determine if MaxX<0 (503)
        then output an error message and exit. (504)
    Set i=Dim-2. (505)
2a. Determine if i<0 (506)
    if yes go to step 3.
    if not determine if (X[i]<0 or X[i]≧MaxX) (507)
        if yes set X[i]=-1(508)
        if not set MaxX=X[i]. (510)
    Set i=i-1 and return to step 2a. (511)
3. Scale the X vector as follows:
    For $0 \leq i \leq (Dim-1)$ set X[i]=X[i]* Scale. (512)
4. Copy and edit vector X into XM and Y into YM as follows:
    Set i=0 and j=0.(513)
4a. Determine if i<Dim. (514)
    If not set CorDim=j and go to step 5. (520)
    If yes determine if X[i]≧0 (516)
        then set XM[j]=X[i]
            and YM[j]=Y[i]
            and j=j+1. (517)
    Set i=i+1 and return to step 4a. (518)
5. Determine if CorDim=0 (521)
    3 then output error message and exit. (522)
6. For $0 \leq i \leq Scale$ set XT[i]=i
    Set YT[0]=YM[0] and i=1 and j=1. (523)
7. Complete the linear interpolation as follows:
    Check if i≦Scale. (530)
        If not return vector YT and end the processing of this function. (550)
        If yes check if j<CorDim-1 (531)
            If not go to step 7b.
7a. If yes check if XT[i]>XM[j] (532)
    If not go to step 7b.

If yes set j=j+1. (533)
   Check if j=CorDim−1. (534)
      If yes go to step 7b.
      If not return to step 7a.
7b. compute;

$$YT[i] = YM[j-1] + \left(\frac{YM[j] - YM[j-1]}{XM[j] - XM[j-1]} * (XT[i] - XM[j-1])\right)$$

Set i=i +1 and return to step 7. (540)
Interpolate "Full" and "Simile" Gamma Tables. (410)
   To process an image we use two algorithms which will be fully described in the next section:
      the Full-algorithm and the Simple-algorithm. Two sets of gamma tables are developped for these algorithms, which are represented by the 1×(Scale +1) vectors:
      RedGammaFull, GreenGammaFull, BlueGammaFull and
      RedGammaSimple, GreenGammaSimple, BlueGammaSimple.

Figure 6:
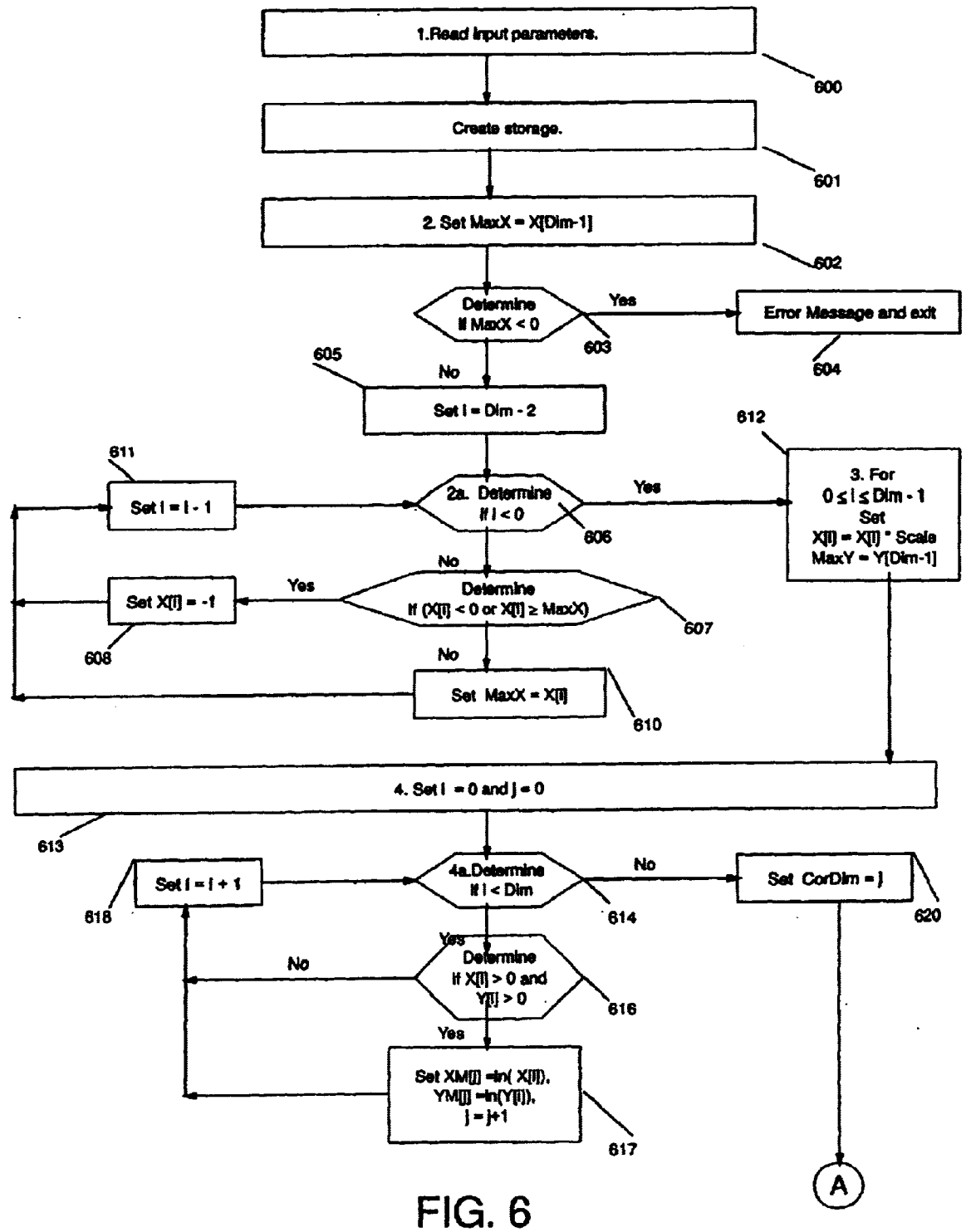
FIG. 6 shows an example of a diagrammatic representation of the LogLogLinInter ( . . . ) function used in calibration to log-log linearly interpolate gamma tables in accordance with the invention.
Figure 6:
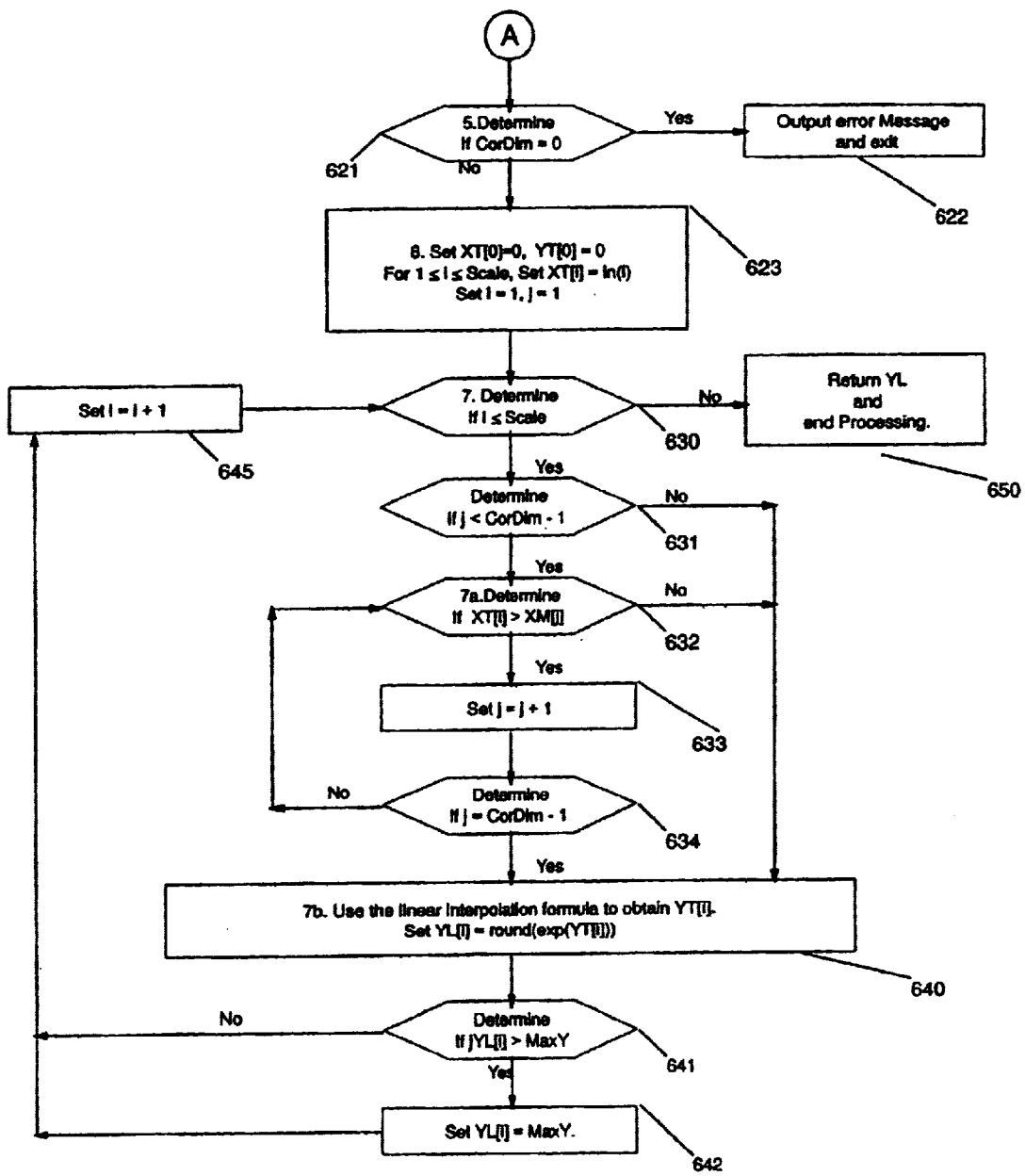

These tables are used to transform matrix-RGB vector coordinates into display-RGB. The first set: RedGammaFull, GreenGammaFull and BlueGammaFull, can be used with either version of the image processing algorithms. While the second set: RedGammaSimple, GreenGammaSimple and BlueGammaSimple, only improves the results of the Simple-algorithm.
   To create these tables we use the following function which is described in detail in FIG. 6, and is represented symbolically by:

YL=LogLogLinInter(Scale, Dim, X, Y)

The input parameters for this function are:
Scale An integer defining the dimension minus one of the table we want to create. It should be several times greater than Dim and in our embodiment we take it equal to 4095.
Dim An integer defining the dimensions of the input vectors. In our embodiment it is equal to M =32.
X A floating point vector of dimension Dim. It contains the abscissa sample points.
Y An integer vector of dimension Dim. It contains the ordinate sample points.
The output of this function is:
YL An integer vector of dimension Scale plus one.
   To compute the 1×(Scale+1) vector RedGammaFull we use for the X parameter of the function LogLogLinInter( ) the first row, GrayMRGB row[0], of the 3×M array GrayMRGB and for the Y parameter the first row, RedDRGB_row[0], of the 3×M array RedDRGB which was defined in (202). Likewise, to create the 1×(Scale+1) vector GreenGammaFull we use for the X parameter of the function LogLogLinInter( ) the second row, GrayMRGB_row[1], of the 3×M array GrayMRGB and for the Y parameter the second row, GreenDRGB_row[1], of the 3×M array GreenDRGB which was defined in (202). Finally, to create the 1×(Scale+1) vector BlueGammaFull we use for the X parameter of the function LogLogLinInter( ) the third row, GrayMRGB_row[2], of the 3×M array GrayMRGB and for the Y parameter the third row, BlueDRGB_row[2], of the 3×M array BlueDRGB which was defined in (202).
   Set RedGammaFull=LogLogLinInter(Scale, M, GrayMRGB_row[0], RedDRGB_row[0])
   Set GreenGammaFull=LogLogLinInter(Scale, M, GrayMRGB_row[1], GreenDRGB_row[1])
   Set BlueGammaFull=LogLogLinInter(Scale, M, GrayMRGB_row[2], BlueDRGB_row[2])
   To compute the three 1×(Scale+1) vectors: RedGammaSimple, GreenGammaSimple and BlueGammaSimple, we first have to scale the three row vectors of the 3×M array GrayMRGB.
   This is done by defining a 3x3 matrix GrayScalingMatrix:

$$GrayScalingMatrix = \begin{pmatrix} \frac{1}{GrayMRGB[0, M-1]} & 0 & 0 \\ 0 & \frac{1}{GrayMRGB[1, M-1]} & 0 \\ 0 & 0 & \frac{1}{GrayMRGB[2, M-1]} \end{pmatrix}$$

Then we multiply GrayScalingMatrix by GrayMRGB and obtain the 3×M array ScaledGray:
   ScaledGray=GrayScalingMatrix*GrayMRGB
   We use the three row vectors of ScaledGray as the X parameters of the LogLogLinInter( ) function to obtain the 1×(Scale+1) vectors: RedGammaSimple, GreenGammaSimple and BlueGammaSimple. This is illustrated by the following three equations where we set:
      RedGamma Simple=LogLogLinInter(Scale, M, ScaledGray_row[0], RedDRGB_row[0])
      GreenGamma Simple=LogLogLinInter(Scale, M, ScaledGray_row[1], GreenDRGB_row[1])
      BlueGamma Simple=LogLogLinInter(Scale, M, ScaledGray_row[2], BlueDRGB_row[2])
   FIG. 6 describes the logic of the LogLogLinInter( ) function:
1. Read parameters: Scale, Dim, X, Y. (600)
   Create storage of type:
      integer for i, j, CorDim, Scale, Dim, MaxY.
      floating point MaxX
      floating point 1×Dim arrays: X[Dim], XM[Dim], YM[Dim]
      integer 1×Dim arrays: Y[Dim].
      integer 1×(Scale+1) array: YL[Scale+1]
      floating point 1×(Scale+1) array: XT[Scale +1], YT[Scale+1]. (601)
2. Monotonize the X vector as follows:
   Set MaxX=X[Dim−1]. (602)
   Determine if MaxX<0 (603)
      then output an error message and exit. (604)
   Set i=Dim−2. (605)
2a. Determine if i<0 then go to step 3. (606)
   Determine if (X[i]<0 or X[i]>MaxX) (607)
      if yes set X[i]=−1 (608)

if not set MaxX=X[i]. (610)
Set i=i−1 and return to step 2a. (611)
3. Scale the X vector and save MaxY as follows:
For 0 <i<(Dim−1) set X[i]=X[i]* Scale.
MaxY=Y[Dim−1](This is true by definition of the Y vector.) (612)
4. Copy and edit vectors X and Y then store their logarithmic values in XM and YM:
Set i=0 and j=0. (613)
4a. Determine if i<Dim. (614)
If not set CorDim=j and go to step 5. (620)
If yes determine if (X[i]>0 and Y[i]>0) (616)
then set XM[j]=ln(X[i])
and YM[j]=ln(Y[i])
and j=j +1. (617)
Set i=i+1 and return to step 4a. (618)
5. Determine if CorDim=0 (621)
then output error message and exit. (622)
6. Set XT[0]=0 and YT[0]=0
For 1≦i≦Scale set XT[i]=ln(i).
Set i=1 and j=1. (623)
7. Complete the linear interpolation as follows:
Check if i≦Scale. (630)
If not return vector YL and end processing this function. (650)
If yes check if j<CorDim−1 (631)
If not go to step 7b.
7a. If yes check if XT[i]>XM[j] (632)
If not go to step 7b.
If yes set j=j+1. (633)
Check if j=CorDim−1. (634)
If yes go to step 7b.
If not return to step 7a.
7b. Compute:

$$YT[i] = YM[j-1] + \left(\frac{YM[j] - YM[j-1]}{XM[j] - XM[j-1]} * (XT[i] - XM[j-1])\right)$$

Set YL[i]=round(exp(YT[i])) (640)
Check if YL[i]>MaxY (641)
then set YL[i]=MaxY. (642)
Set i=i +1 and return to step 7. (645)

C. Image Processing

Figure 7:
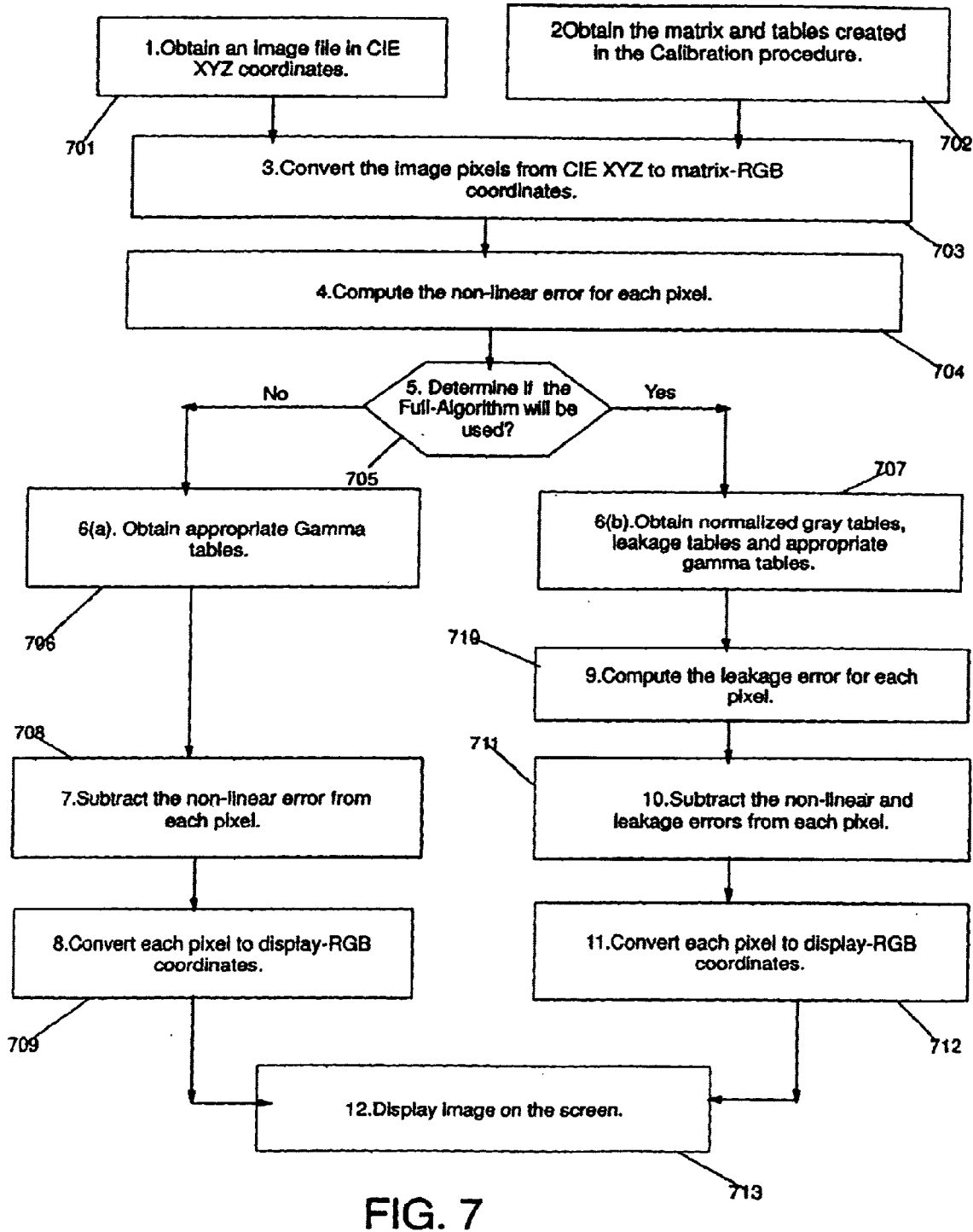
FIG. 7 shows an example of a diagrammatic representation of image processing for converting. an image pixel in CIE XYZ coordinates to display RGB in accordance with the invention.

This section describes two algorithms which can be used to display an image: the Simple-algorithm and the Full-algorithm. The former requires less computations than the latter but it is also less precise. FIG. 7 gives an overview of the steps required to process an image:
1. Obtain a CIE XYZ image file. (701)
2. Access the results of the calibration section which are: the inverse display matrix Mdi, the average 1×3 black matrix-RGB vector AvgBlackMRGB, the three (3×(Scale+1)) non-linear matrix-RGB error arrays: InterRedErrorMRGB, InterGreenErrorMRGB, InterBlueErrorMRGB. (702)
3. For every pixel AnyPixelXYZ of the image file, convert its vector coordinates from CIE XYZ to matrix-RGB, subtract average black and obtain AnyPixelMRGB by performing the following operations:
AnyPixelMRGB=(Mdi*AnyPixelXYZ)
AnyPixelMRGB−AvgBlackMRGB (703)
4. Round the coordinates of AnyPixelMRGB and then estimate its non-linear error vector:
PixelErrorMRGB. (704)
5. Determine whether the processing will be done with the Simple-Algorithm or the Full-Algorithm. (705)
6(a). If we choose the Simple-Algorithm then we must obtain the three gamma 1×(Scale+1) vector tables: RedGammaSimple, GreenGammaSimple, BlueGammaSimple and compute, as it will be shown in the next section, the 1×3 error vector PixelErrorMRGB. Then we perform the next two steps: (706)
7. Compute the 1×3 corrected pixel vector CorrAnyPixelMRGB:
CorrAnyPixelMRGB=AnyPixelMRGB−PixelErrorMRGB (708)
8. Round the coordinates of CorrAnyPixelMRGB and use the "Simple" gamma tables to ompute AnyPixelDRGB. Then go to step 12. (709)
6(b). If we select the Full-Algorithm then we obtain the three gamma 1×(Scale+1) vector tables:
RedGammaFull, GreenGammaFull, BlueGammaFull. We also obtain the three 1×(Scale+1) leakage tables: InterRedLeakMRGB, InterGreenLeakMRGB, InterBlueLeakMRGB and the three 1×(Scale+1) normalized gray tables: InterGrayRedNorm, InterGrayGreenNorm, InterGrayBlueNorm. Then, we perform the next three steps. (707)
9. Normalize AnyPixelMRGB and obtain AnyPixelNorm. Using the normalized gray tables we compute the coefficients RedCoeff, GreenCoeff and BlueCoeff. Then we apply the leakage tables and get PixelLeakDRGB. (710)
10. Compute the corrected pixel vector which uses the non-linear error vector PixelErrorMRGB and the leakage vector PixelLeakDRGB. The computation of these two vectors will be explained in a subsequent section. Then, we obtain the corrected matrix-RGB vector CorrAnyPixelMRGB.:
CorrAnyPixelMRGB=AnyPixelMRGB−PixelErrorMRGB−PixelLeakDRGB (711)
11. Round the coordinates of CorrAnyPixelMRGB and use the "Full" gamma tables to compute AnyPixelDRGB as it will be shown in a subsequent section. Then go to step 12. (712)
12. Display AnyPixelDRGB on the screen. (713)

Figure 8:
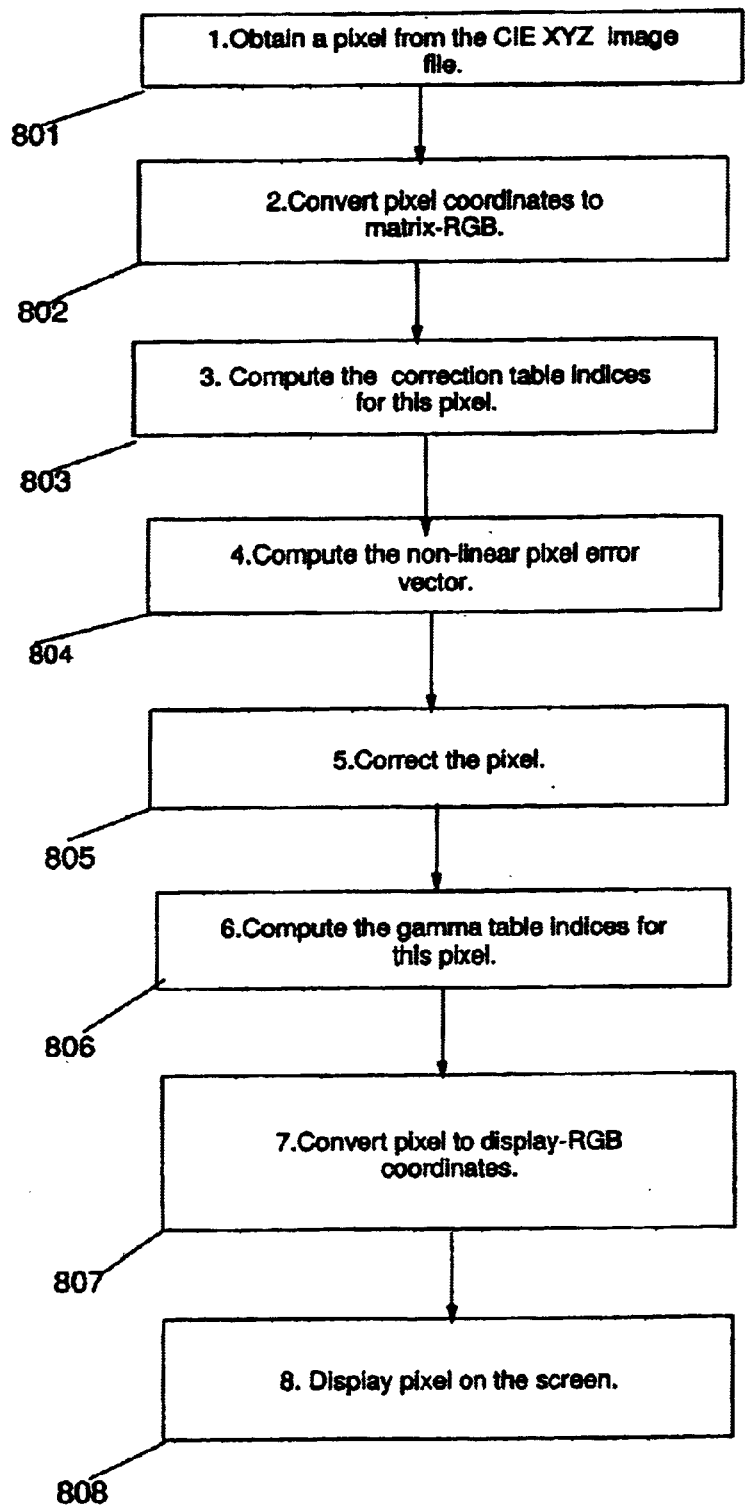
FIG. 8 shows an example of a diagrammatic representation of processing steps used in a Simple-algorithm in accordance with the invention.

FIG. 8 explains in greater detail the processing required by the Simple-algoritm when applied to any pixel of a CIE XYZ image file.
1. For 0≦i≦2 obtain AnyPixelXYZ[i] the CIE XYZ coordinates of an image pixel. (801)
2. Convert the matrix coordinates from CIE XYZ to matrix-RGB then subtract average black:
AnyPixelMRGB=(Mdi*AnyPixelXYZ)
AnyPixelMRGB=AnyPixelMRGB−AvgBlackMRGB (802)
3. Determine the correction table indices for this pixel. This is done as follows:
Compute for 0≦i≦2
RoundAny[i]=round(AnyPixelMRGB[i]*Scale)
Where Scale is equal to the value chosen in the calibration section. For our embodiment Scale=4095.
For 0≦i≦2 if RoundAny[i]≦0 then take RoundAny[i]=0. Also, if RoundAny[i]>Scale then take RoundAny[i]=Scale. (803)
4. Compute the non-linear pixel error using the interpolated error tables, these as we recall are 3×(Scale+1) error arrays InterRedErrorMRGB, InterGreenErrorMRGB and InterBlueErrorMRGB. Then obtain the vector PixelErrorMRGB.
For 0≦i≦2:
PixelErrorMRGB[i]=InterRedErrorMRGB[i, RoundAny[0]]+InterGreenErrorMRGB[i, RoundAny[1]]+InterBlueErrorMRGB[i, RoundAny[2]] (804)

5. Correct the pixel using the PixelErrorMRGB and obtain CorrAnyPixelMRGB:

CorrAnyPixelMRGB=AnyPixelMRGB−PixelErrorMRGB (805)

6. Compute the gamma table indices for this pixel. This is done as follows:

Compute for $0 \leq i \leq 2$
   RoundCorr[i]=round(CorrAnyPixelMRGB[i]* Scale)
   Where Scale is equal to the value chosen in the calibration section. For our embodiment Scale =4095.

For $0 \leq i \leq 2$: if RoundCorr[i]<0 then take RoundCorr[i]=0.
   Also, if RoundCorr[i]>Scale then take RoundCorr[i]=Scale. (806)

7. Convert matrix-RGB coordinates for the corrected pixel into display-RGB coordinates using the "Simple" gamma tables and obtain the display-RGB vector AnyPixelDRGB:

$$AnyPixelDRGB = \begin{pmatrix} RedGammaSimple[RoundCorr[0]] \\ GreenGammaSimple[RoundCorr[1]] \\ BlueGammaSimple[RoundCorr[2]] \end{pmatrix} \quad (807)$$

8. Display AnyPixelDRGB[i] on the screen. (808)

Figure 9:
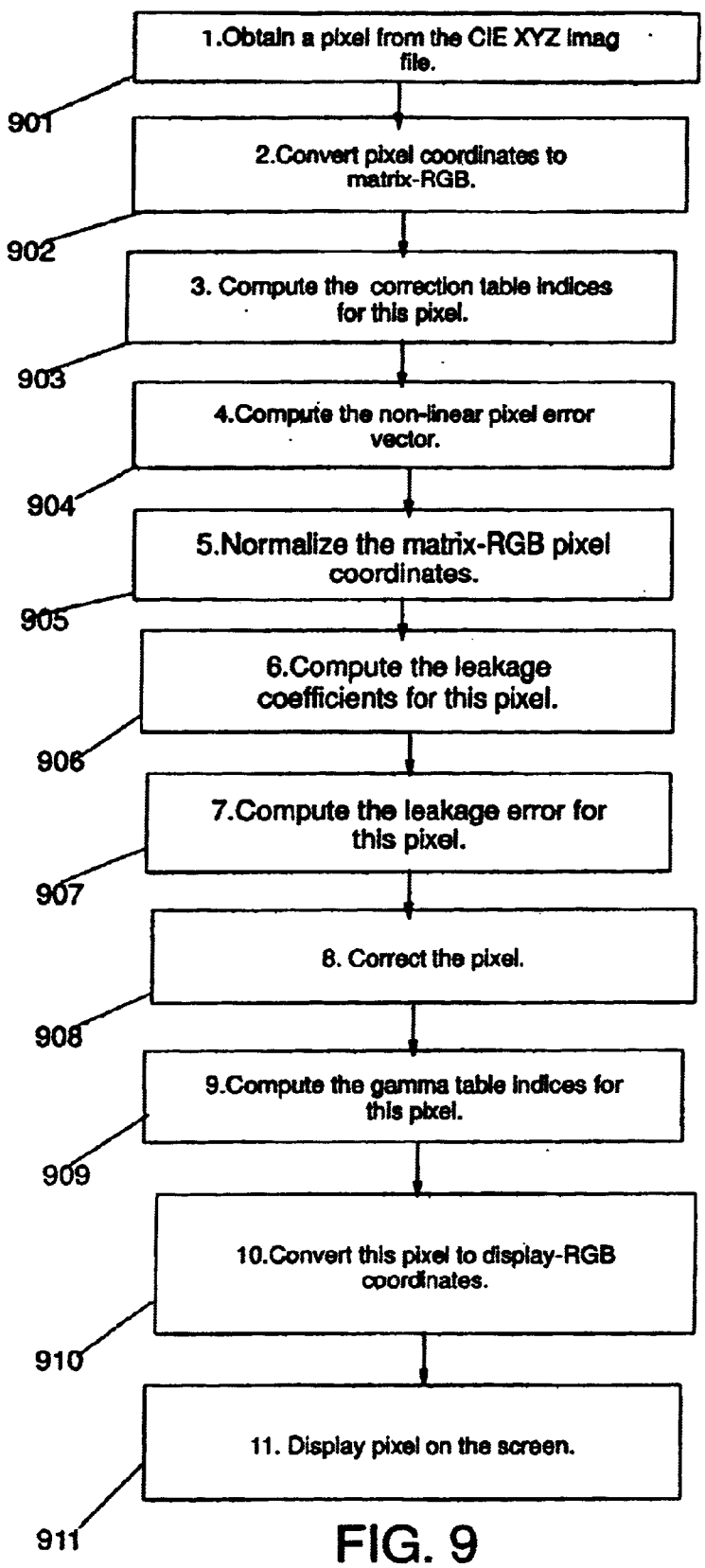
FIG. 9 shows an example of a diagrammatic representation of processing steps used in a Full-algorithm in accordance with the invention.

FIG. 9 explains in greater detail the processing required by the Full-Algoritm when applied to any pixel of a CIE XYZ image file. The first four steps are identical to those of FIG. 8.

1. For $0 \leq i \leq 2$ obtain AnyPixelXYZ[i] the CIE XYZ coordinates of an image pixel. (901).
2. Convert the matrix coordinates from CIE XYZ to matrix-RGB then subtract average black:

AnyPixelMRGB=(Mdi*AnyPixelXYZ)
   AnyPixelMRGB=AnyPixelMRGB−AvgBlackMRGB (902)

3. Determine the correction table indices for this pixel. This is done as follows:

Compute for $0 \leq i \leq 2$
   RoundAny[i]=round(AnyPixelMRGB[i]* Scale)
   Where Scale is equal to the value chosen in the calibration section. For our embodiment Scale=4095.

For $0 \leq i \leq 2$ if RoundAny[i]<0 then take RoundAny[i]=0.
   Also, if RoundAny[i]>Scale then take RoundAny[i]=Scale. (903)

4. Compute the non-linear pixel error, PixelErrorMRGB, using the 3×(Scale+1) interpolated error tables: InterRedErrorMRGB, InterGreenErrorMRGB and InterBlueErrorMRGB.

For $0 \leq i \leq 2$:
   PixelErrorMRGB[i]=InterRedErrorMRGB[i, RoundAny[0]]+InterGreenErrorMRGB[i, RoundAny[1]]+InterBlueErrorMRGB[i, RoundAny[2]] (904)

5. Normalize the coordinates of AnyPixelMRGB[i]. This is done as follows:

SumCoords=AnyPixelMRGB[0]+AnyPixelMRGB[1]+AnyPixelMRGB[2]

$$AnyPixelNorm = \begin{pmatrix} \frac{AnyPixelMRGB[0]}{SumCoords} \\ \frac{AnyPixelMRGB[1]}{SumCoords} \\ \frac{AnyPixelMRGB[2]}{SumCoords} \end{pmatrix} \quad (905)$$

6. Compute the leakage coefficients, RedCoeff, GreenCoeff and BlueCoeff, for this pixel using the 1×(Scale+1) vectors: InterGrayRedNorm, InterGrayGreenNorm and InterGrayBlueNorm and the following formulas:

$$RedCoeff = \frac{AnyPixelNorm[0] - InterGrayRedNorm[RoundAny[0]]}{1 - InterGrayRedNorm[RoundAny[0]]}$$

$$GreenCoeff = \frac{AnyPixelNorm[1] - InterGrayGreenNorm[RoundAny[1]]}{1 - InterGrayGreenNorm[RoundAny[1]]}$$

$$BlueCoeff = \frac{AnyPixelNorm[2] - InterGrayBlueNorm[RoundAny[2]]}{1 - InterGrayBlueNorm[RoundAny[2]]}$$

Determine if RedCoeff<0 then set RedCoeff=0.
Determine if GreenCoeff<0 then set GreenCoeff=0.
Determine if BlueCoeff<0 then set BlueCoeff=0. (906)

7. Use the three interpolated 1×(Scale+1) leakage error tables: InterRedLeak, InterGreenLeak and InterBlueLeak, to compute the leakage error vector, LeakageErrorMRGB, for this pixel:

LeakageErrorMRGB = (907)

$$\begin{pmatrix} RedCoeff * InterRedLeak[RoundAny[0]] \\ GreenCoeff * InterGreenLeak[RoundAny[1]] \\ BlueCoeff * InterBlueLeak[RoundAny[2]] \end{pmatrix}$$

8. Correct the pixel and obtain CorrAnyPixelMRGB:

CorrAnyPixelMRGB=AnyPixelMRGB−PixelErrorMRGB−LeakageErrorMRGB (908)

9. Compute the gamma table indices for this pixel. This is done as follows:

Compute for $0 \leq i \leq 2$
   RoundCorr[i]=round(CorrAnyPixelMRGB[i]*Scale)
   Where Scale is equal to the value chosen in the calibration section. For our embodiment Scale=4095.

For $0 \leq i \leq 2$: if RoundCorr[i]<0 then RoundCorr[i]=0.
   Also, if RoundCorr[i]>Scale then RoundCorr[i]=Scale. (909)

10. Convert matrix-RGB coordinates for the corrected pixel into display-RGB coordinates using the "Full" gamma tables:

$$AnyPixelDRGB[i] = \begin{pmatrix} RedGammaFull[RoundCorr[0]] \\ GreenGammaFull[RoundCorr[1]] \\ BlueGammaFull[RoundCorr[2]] \end{pmatrix} \quad (910)$$

11. Display AnyPixelDRGB[i] on the screen. (911)

It is noted that although the description of the invention is made for particular arrangements of steps, the intent and concept of the present invention are suitable and applicable to other arrangements. For example, the invention is also adaptable to the situation where the calibration results of one display (by this we mean: matrix Md, average black, correction and gamma tables) can be used to color calibrate other displays manufactured in the same production run. It is also adaptable to the situation where the lowest level for primary red corresponding to CIE X>0 has display-RGB R>0, or the lowest level for primary green corresponding to CIE Y>0 has display-RGB G>0 or the lowest level for primary blue corresponding to CIE Z>0 has display-RGB B>0. In any one of these cases the useful range for the corresponding primary will have to start at a level greater than zero. Also, It will be clear to those skilled in the art that other modifications to the disclosed embodiments can be effected without departing from the spirit and scope of the invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

All variations and modifications are intended to be included within the scope of the invention as defined in the appended claims.

What is claimed is:

1. A method for color calibrating an LCD display, said method comprising:
    measuring color patches of primaries and grays of said LCD display to obtain measurement data;
    wherein said step of measuring includes:
        determining useful display-RGB ranges of the primaries by rendering uniform color patches on said LCD display;
        measuring CIE XYZ coordinates of each of said uniform color patches;
        using said display-RGB ranges to determine sample points for the primaries and related grays;
        rendering said sample points;
        measuring and storing results in a display profile;
        creating said display profile from the measurement data;
        wherein said step of creating said display profile includes
            reading the CIE XYZ measurements from the display profile;
            subtracting black from all the CIE XYZ measurements;
            computing a display matrix Md and its inverse Mdi matrix from the CIE XYZ measurements corresponding to the maximum levels of the primaries;
            transforming all the measurements from CIE XYZ to matrix-RGB coordinates using the inverse Mdi; and
            computing non-linear errors and color leakages for the primaries using the matrix-RGB coordinates of grays and primaries and
            calibrating said LCD display using the display profile in conjunction with display specific corrections for said display in forming calibration results.

2. A method as in claim 1, further comprising forming a model for said display LCD.

3. A method as in claim 1, wherein the step of calibrating includes:
    creating color correction tables; and
    computing two sets of gamma tables.

4. A method as in claim 3, wherein the step of creating color correction tables includes using linear interpolation.

5. A method as in claim 3, wherein the step of computing two sets of gamma tables includes using log-log linear interpolation.

6. A method as in claim 3, further comprising processing images using the calibration results, wherein the step of processing includes converting the CIE XYZ coordinates of pixel data stored in an image file into display-RGB using the inverse matrix Mdi, average black, correction and gamma tables.

7. A method as in claim 6, wherein the step of converting the CIE XYZ coordinates of pixel data stored in an image file into display-RGB employs a Simple-algorithm.

8. A method as in claim 6, wherein the step of converting the CIE XYZ coordinates of pixel data stored in an image file into display-RGB employs a Full-algorithm.

9. A method as in claim 1, wherein the step of determining useful display-RGB ranges includes:
    determining restricted display-RGB ranges for the red, green and blue primaries of an LCD, by:
        performing photometric measurements on the display by:
            rendering three sets of primary patches from a display-RGB low level to a display-RGB maximum level;
            reading a CIE XYZ measurement for each patch;
            creating a two dimensional graph for each set;
            determining a maximum CIE X for the red patches such that all lower intensities are monotonically decreasing from said maximum CIE X, and saving a display-RGB red intensity level corresponding with said CIE X;
            determining a maximum CIE Z for the blue patches such that all lower intensities are monotonically decreasing from said maximum CIE Z, and saving a display-RGB blue intensity level corresponding with said CIE Z;
        forming a restricted red range being from a minimum red intensity level to said display-RGB red intensity level;
        forming a restricted green range being from a minimum green intensity level to said display-RGB green intensity level; and
        forming a restricted blue range being from a minimum blue intensity level to said display-RGB blue intensity level,
        wherein said restricted red range, said restricted green range and said restricted blue range form said useful display-RGB ranges.

10. A method as in claim 9, wherein at least one of the restricted ranges is an entire display-RGB range for said primary.

11. A method as in claim 1, further comprising processing images using the calibration results.

12. A method as in claim 1, wherein the display specific corrections overcome at least one deficiency taken from a group of deficiencies which includes high intensity display black, non additivity of primaries, leakage between subpixels, other non linearities.

13. A method as in claim 1, wherein the display profile includes 3×M CIE XYZ arrays for red, green, blue and gray, where M is a number of color patches rendered for red, green, blue and gray, and the display specific corrections overcomes a high intensity display black by:
   computing an average 1×3 black vector for the display;
   subtracting the black vector from each column vector of the 3×M CIE XYZ arrays for red, green, blue and gray.

14. A method as in claim 1, wherein the display specific corrections overcomes non linear errors in the display by:
   computing the display matrix;
   using the display matrix to transform data from CIE XYZ to matrix-RGB coordinates;
   decomposing a gray array and total leakage arrays into each array's primary components;
   computing the non-linear error arrays using said each array's primary components; and
   employing the non-linear error arrays in an image processing display algorithm.

15. A method as in claim 14, further comprising computing a total leakage array.

16. A method as in claim 15, wherein the step of computing a total leakage array includes employing leakage coefficients for each pixel for each primary.

17. A method comprising:
   determining restricted display-RGB ranges for the red, green and blue primaries of an LCD, by:
      performing photometric measurements on the display by:
         rendering three sets of primary patches from a display-RGB low level to a display-RGB maximum level;
         reading a CIE XYZ measurement for each patch;
         creating a two dimensional graph for each set;
         determining a maximum CIE X for the red patches such that all lower intensities are monotonically decreasing from said maximum CIE X, and saving a display-RGB red intensity level corresponding with said CIE X;
         determining a maximum CIE Y for the green patches such that all lower intensities are monotonically decreasing from said maximum CIE, and saving a display-RGB green intensity level corresponding with said CIE Y;
         determining a maximum CIE Z for the blue patches such that all lower intensities are monotonically decreasing from said maximum CIE Z, and saving a display-RGB blue intensity level corresponding with said CIE Z;
      forming a restricted red range being from a minimum red intensity level to said display-RGB red intensity level;
      forming a restricted green range being from a minimum green intensity level to said display-RGB green intensity level; and
      forming a restricted blue range being from a minimum blue intensity level to said display-RGB blue intensity level.

18. A method for determining a color profile for a display, said method comprising:
   rendering on the display one at a time, one of M red patches, one of M green patches, one of M blue patches, and one of M gray patches,
   separately dividing each intensity level range of the red, the green, and the blue into M sample points;
   determining a related gray for the M sample points of each of the corresponding red, green, and blue intensity levels;
   forming separate 3×M display-RGB arrays for the red patches, the green patches, the blue patches, and the gray patches resulting in a corresponding separate 3×M array for the red, the green, the blue and the gray;
   performing a color patch measurements for each of the 4×M patches and obtaining separate red, green, blue and grey measured 3×M corresponding CIE XYZ arrays; and
   storing the display-RGB arrays and the corresponding CIE XYZ arrays to form said color profile of the display.

19. A method as in claim 18, further comprising finding useable ranges of display RGB for each primary.

20. A method as in claim 19, wherein the step of finding includes:
   employing display-RGB coordinates and determining a maximum CIE X such that all lower intensities are monotonically decreasing from said maximum CIE X;
   employing display-RGB coordinates and determining a maximum CIE Y such that all lower intensities are monotonically decreasing from said maximum CIE Y; and
   employing display-RGB coordinates and determining a maximum CIE Z such that all lower intensities are monotonically decreasing from said maximum CIE Z.

21. A method to obtain calibration operators for a display, the method comprising:
   obtaining a color profile and an average black CIE XYZ vector for the display;
   forming a sum primary array from the red, green and blue modified 3×M arrays;
   subtracting the gray modified 3×M array from the sum primary array forming a sum leakage array for the display;
   forming Md and Mdi matrixes from the red, green and blue modified 3×M arrays;
   employing the Mdi matrix to transform the modified 3×M arrays, the sum primary array, the sum leakage array, the gray arrays and the average black array into matrix-RGB arrays;
   decomposing the matrix-RGB gray array into its red, green and blue components and forming 3×M arrays of these components;
   decomposing the matrix-RGB sum leakage array into its red, green and blue components and forming 3×M arrays of these components;
   computing the red, green and blue 3×M non-linear arrays using the primary arrays, the leakage component arrays and the gray component arrays;
   creating a model from the 3×M primary arrays, sum primary array, gray array, gray component arrays, non-linear error arrays, sum leakage array and leakage component arrays;
   interpolating 3×M non-linear error arrays into 3× (Scale+1) non-linear tables;
   interpolating 3×M leakage component arrays into 1× (Scale+1) non-linear tables;
   computing 3×M normalized gray array using gray array;
   interpolating 3×M normalized gray array into 1× (Scale+1) normalized gray tables;

interpolating two sets of gamma tables;

computing red, green and blue coefficients to determine the leakage of a pixel.

22. A method as in claim 21, further comprising subtracting the average black vector from each column vector of the four measured 3×M CIE XYZ arrays in the color profile forming red, green, blue and grey modified 3×M arrays.

23. A method as in claim 21 wherein the Md matrix is maximum levels of each modified array.

24. A method as recited in claim 19, wherein each patch has an area of 10×10 cm.

25. A method as recited in claim 18, wherein the display is in display-RGB coordinates.

26. A method as in claim 1, wherein the step of calibrating includes creating color correction tables, and computing sets of gamma tables, and further comprises employing the matrix Mdi, average black, correction tables and gamma tables developed for one display, for calibration of at least one other display.

27. A method as in claim 26, wherein said at least one other display is manufactured in the same production run as said one display.

28. An article of manufacture comprising a computer usable medium having computer readable program code means embodied therein for causing color calibration of a display, the computer readable program code means in said article of manufacture comprising computer readable program code means for causing a computer to effect the steps of claim 1.

29. An article of manufacture comprising a computer usable medium having computer readable program code means embodied therein for causing determination of a color profile for a display, the computer readable program code means in said article of manufacture comprising computer readable program code means for causing a computer to effect the steps of claim 18.

30. A computer program product comprising a computer usable medium having computer readable program code means embodied therein for causing color calibration of a display, the computer readable program code means in said computer program product comprising computer readable program code means for causing a computer to effect the steps of claim 1.

31. A program storage device readable by machine, tangibly embodying a program of instructions executable by the machine to perform method steps for color calibrating a display, said method steps comprising the steps of claim 1.

32. A program storage device readable by machine, tangibly embodying a program of instructions executable by the machine to perform method steps for determining a color profile for a display, the computer readable program code means in said article of manufacture comprising computer readable program code means for causing a computer to effect the steps of claim 18.

* * * * *